(12) United States Patent
Nakamura

(10) Patent No.: US 10,551,942 B2
(45) Date of Patent: Feb. 4, 2020

(54) WRITING DATA PROCESSING DEVICE FOR CORRECTING POSITION DISCREPANCIES IN CHARACTERS

(71) Applicant: Brother Kogyo Kabushiki Kaisha, Nagoya-shi, Aichi-ken (JP)

(72) Inventor: Tomoki Nakamura, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 217 days.

(21) Appl. No.: 15/665,825

(22) Filed: Aug. 1, 2017

(65) Prior Publication Data

US 2017/0329424 A1 Nov. 16, 2017

Related U.S. Application Data

(63) Continuation of application No. PCT/JP2016/058334, filed on Mar. 16, 2016.

(30) Foreign Application Priority Data

Apr. 27, 2015 (JP) ................................. 2015-090810

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC .. G06F 3/03545; G06F 3/044; G06F 3/04883; G06K 9/20
See application file for complete search history.

(56) References Cited

U.S. PATENT DOCUMENTS

2014/0294306 A1 10/2014 Fujita
2015/0242114 A1* 8/2015 Hirabayashi ........ G06F 3/04883
345/156

(Continued)

FOREIGN PATENT DOCUMENTS

JP H10-301701 A 11/1998
JP 2005-38077 A 2/2005

(Continued)

OTHER PUBLICATIONS

May 24, 2016—International Search Report—Intl App PCT/JP2016/058334.

(Continued)

*Primary Examiner* — Ryan A Lubit
(74) *Attorney, Agent, or Firm* — Banner & Witcoff, Ltd.

(57) ABSTRACT

A writing data processing device includes a processor and a memory. The memory stores computer-readable instructions that, when executed by the processor, perform processes. The processes include acquiring stroke data describing a plurality of tracks of a writing portion on a mount portion. The processes include identifying the tracks as a group among the plurality of the tracks described by the acquired stroke data. The processes include acquiring a group region. The processes include selecting an entry frame from among at least one entry frame described by entry frame data included in paper medium data that is stored in a storage portion and is corresponding to the paper medium. The entry frame to be selected has the greatest amount of overlap with the acquired group region. The processes include moving the identified group included in the acquired group region into the selected entry frame.

7 Claims, 36 Drawing Sheets

(56) References Cited

U.S. PATENT DOCUMENTS

2015/0347364 A1* 12/2015 Zhang ................. G06F 3/04842
715/802
2016/0154579 A1* 6/2016 Lee ..................... G06F 3/04883
382/189

FOREIGN PATENT DOCUMENTS

| JP | 2005-301652 A | | 10/2005 |
|---|---|---|---|
| JP | 2005301652 A | * | 10/2005 |
| JP | 2007-48217 A | | 2/2007 |
| JP | 2008-15929 A | | 1/2008 |
| JP | 2014-191662 A | | 10/2014 |
| WO | 2008/004624 A1 | | 1/2008 |

OTHER PUBLICATIONS

Oct. 31, 2017—International Preliminary Report on Patentability—Int'l App PCT/JP2016/058334, Eng Tran.
Jun. 12, 2018—(JP) Notification of Reasons for Rejection—App 2015-090810, Eng Tran.

* cited by examiner

FIG. 4

FIG. 11E
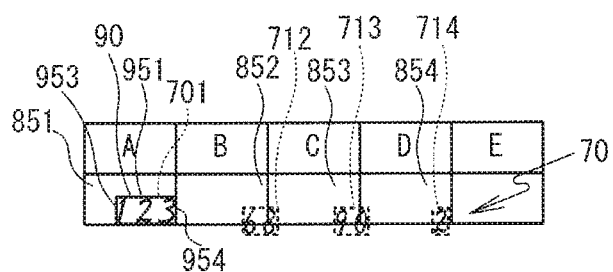
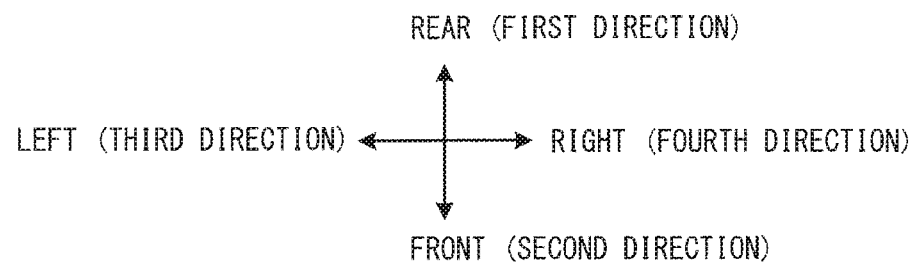

FIG. 12
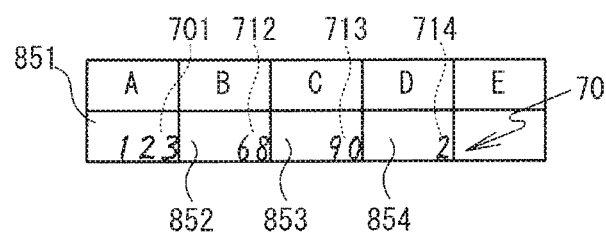
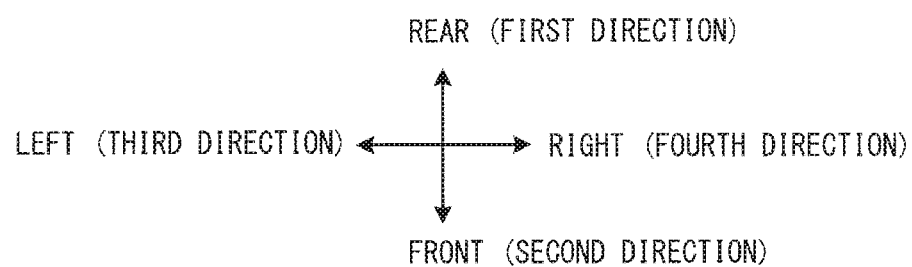

FIG. 14B
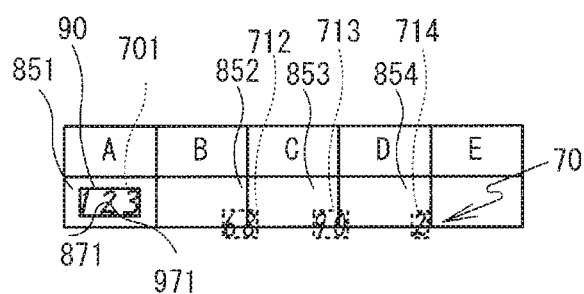
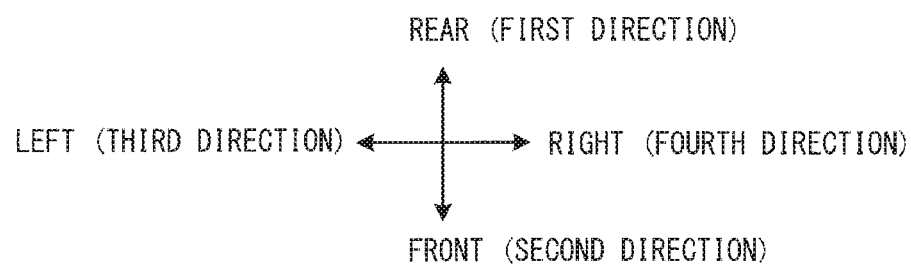

FIG. 16A
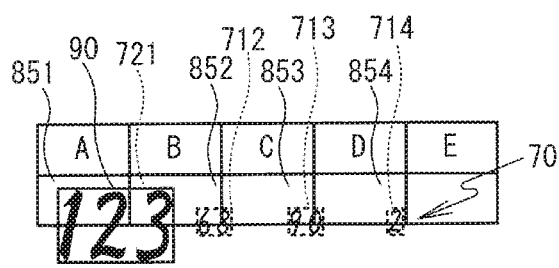
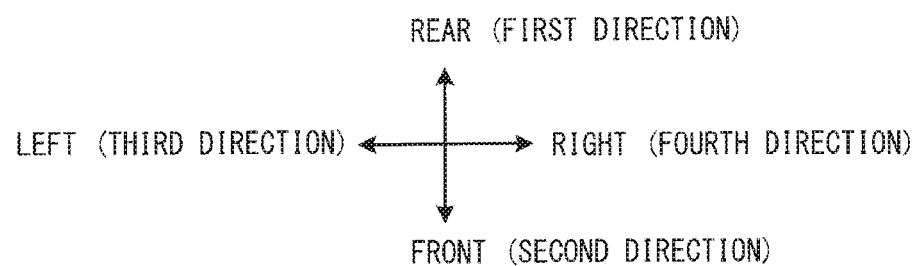

FIG. 16C
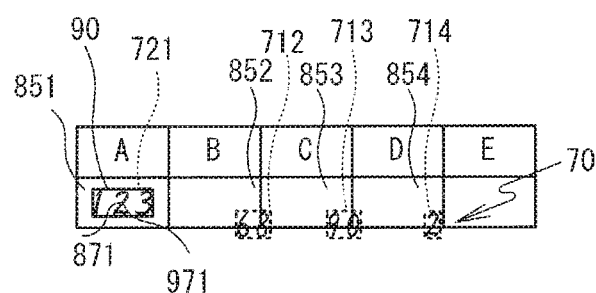
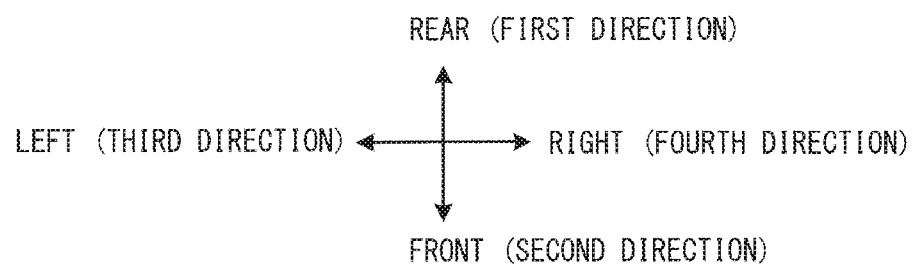

FIG. 16D
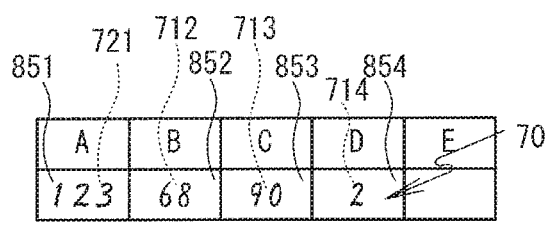
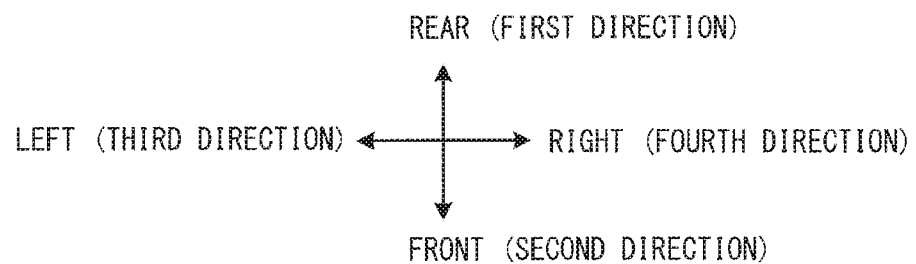

FIG. 18A
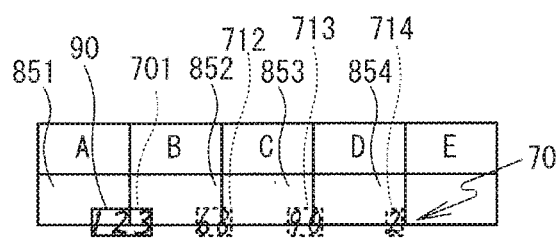
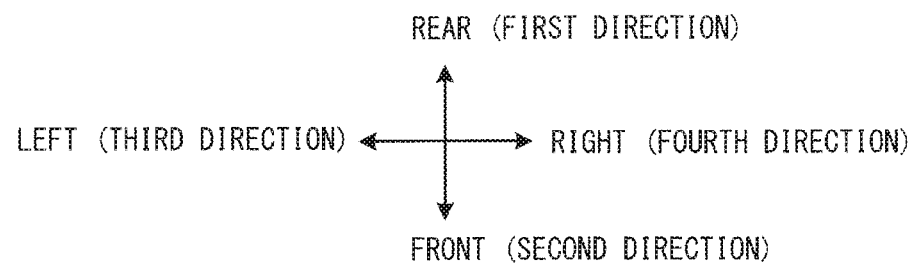

FIG. 18B
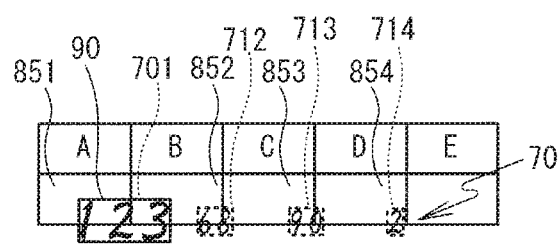
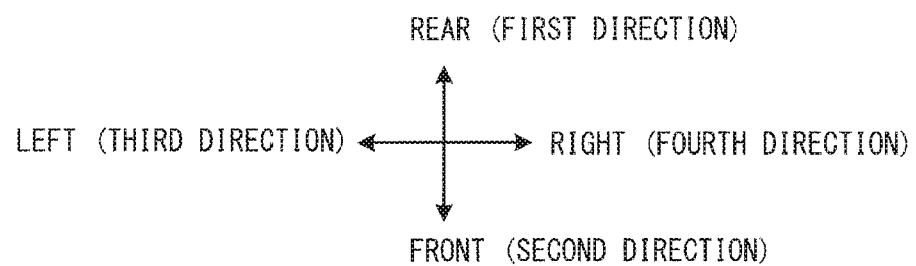

FIG. 18C
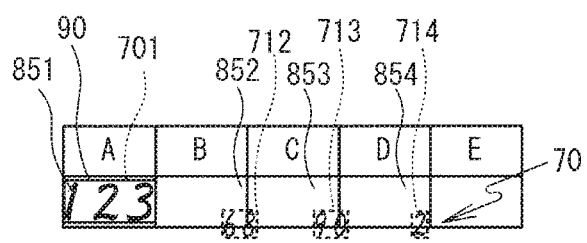
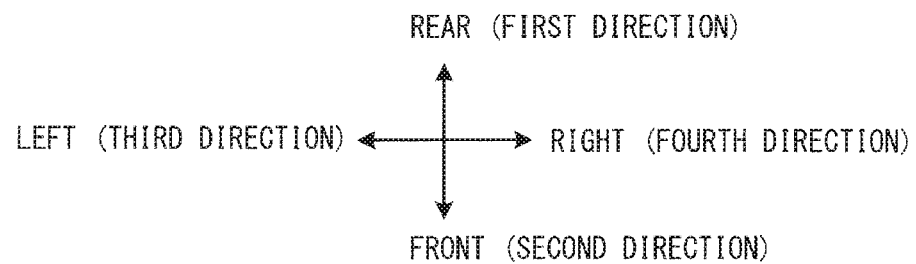

FIG. 18D
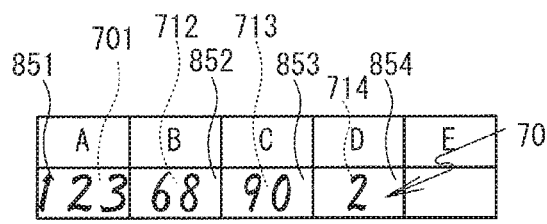
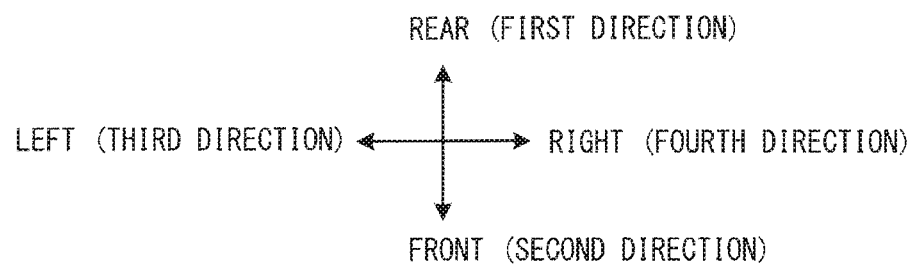

WRITING DATA PROCESSING DEVICE FOR CORRECTING POSITION DISCREPANCIES IN CHARACTERS

CROSS-REFERENCE TO RELATED APPLICATION

This application is a continuation application of International Application No. PCT/JP2016/058334, filed Mar. 16, 2016, which claims priority from Japanese Patent Application No. 2015-090810, filed on Apr. 27, 2015. The disclosure of the foregoing application is hereby incorporated by reference in its entirety.

BACKGROUND

The present disclosure relates to a writing data processing device that corrects position discrepancies in text characters and the like.

A writing data processing device is known that processes stroke data that correspond to text characters and the like that are written on a paper medium. In the writing data processing device, shifting of the paper medium or the like sometimes causes position discrepancies between a writing track, which is described by the stroke data, and ruled lines or the like that are described by data that correspond to the paper medium. Therefore, a writing data processing device has been proposed that corrects for position discrepancies. A correction device of the writing data processing device stores a reference mark and a surrounding region, the reference mark serving as a reference for correcting the position of the track that is described by the stroke data and the surrounding region being the region that surrounds the reference mark. A user writes along the reference mark on the paper medium. In a case where the track that is described by the acquired stroke data is contained within the surrounding region, the correction device corrects the position of the track that is described by the stroke data, based on the amount of discrepancy between the reference mark and the track that is described by the stroke data and that is contained within the surrounding region.

SUMMARY

In some cases, entry frames in which the user is able to enter a name, a date, and various types of items are provided on the paper medium. In this case, shifting of the paper medium may give rise to a position discrepancy between the entry frames, which are described by data that correspond to the paper medium, and the track that is described by the stroke data.

Various embodiments of the broad principles described herein provide a writing data processing device that utilizes a new correction method to move the track within the entry frame.

Embodiments herein provide a writing data processing device that includes a processor and a memory. The memory stores computer-readable instructions that, when executed by the processor, perform the processes. The processes include acquiring stroke data describing a plurality of tracks of a writing portion on a mount portion on which a paper medium to be mounted. The processes include identifying the tracks as a group among the plurality of the tracks described by the acquired stroke data. Each of the tracks included in the group is not greater than a specified distance from one another. The processes include acquiring a group region. The group region is a region that includes the identified group. The processes include selecting an entry frame from among at least one entry frame described by entry frame data included in paper medium data that is stored in a storage portion and is corresponding to the paper medium. The entry frame to be selected has the greatest amount of overlap with the acquired group region. The processes include moving the identified group included in the acquired group region into the selected entry frame.

BRIEF DESCRIPTION OF THE DRAWINGS

Embodiments will be described below in detail with reference to the accompanying drawings in which:

FIG. 4 is an image of the paper medium that is described by paper medium data;

FIG. 11E is a state transition diagram for the track in the main processing;

FIG. 12 is a state transition diagram for the track in the main processing;

FIG. 14B is a transition diagram for the track in the second embodiment;

FIG. 16A is a transition diagram for the track in the third embodiment;

FIG. 16C is a transition diagram for the track in the third embodiment;

FIG. 16D is a transition diagram for the track in the third embodiment;

FIG. 18A is a transition diagram for the track in the fourth embodiment;

FIG. 18B is a transition diagram for the track in the fourth embodiment;

FIG. 18C is a transition diagram for the track in the fourth embodiment;

FIG. 18D is a transition diagram for the track in the fourth embodiment;

DETAILED DESCRIPTION

Figure 1:
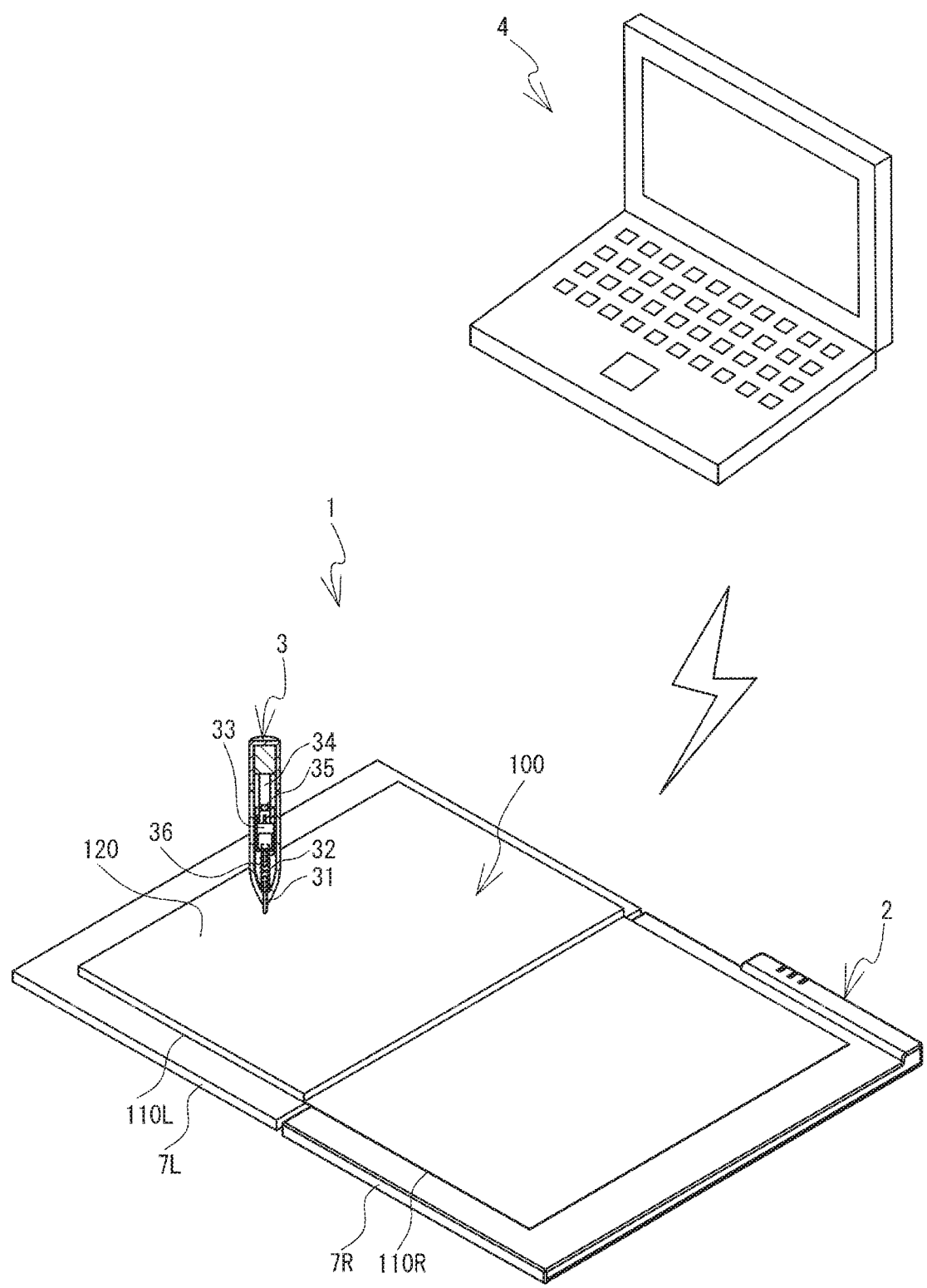
FIG. 1 is a configuration diagram of a handwriting input system.

Embodiments of the present disclosure will be explained with reference to the drawings. An overview of a handwriting input system 1 according to a first embodiment will be explained with reference to FIG. 1. Hereinafter, the upper left side, the lower right side, the top side, the bottom side, the upper right side, and the lower left side in FIG. 1 respectively correspond to the left side, the right side, the top side, the bottom side, the rear side, and the front side of a reading device 2.

The handwriting input system 1 includes the reading device 2, an electronic pen 3, a PC 4, and the like. In the handwriting input system 1, a user uses the electronic pen 3 to enter text (a text character, a numeric character, a symbol, a graphic figure, or the like) on a paper medium 100 that is affixed to the reading device 2. By detecting the track of the electronic pen 3 that enters the text on the paper medium 100, the reading device 2 acquires stroke data, which will be described later. Based on the stroke data that the reading device 2 has acquired, the PC 4 is able to create data and the like that describe, in electronic form, the text that has been entered on the paper medium 100.

The reading device 2 includes a left-right pair of sensor circuit boards 7L, 7R. The sensor circuit boards 7L, 7R have identical shapes. The sensor circuit boards 7L, 7R are rectangular and have thin plate shapes. The sensor circuit boards 7L, 7R can be opened to the left and right. In each one of the sensor circuit boards 7L, 7R, a plurality of long, thin loop coils are arrayed along both an X-axis and a Y-axis. The sensor circuit boards 7L, 7R can be folded together. The reading device 2 is a thin, lightweight handwriting input device.

The electronic pen 3 is a known electromagnetic induction type of electronic pen. The electronic pen 3 is provided with a core 31, a coil 32, a variable capacitor 33, a circuit board 34, a capacitor 35, and an ink storage portion 36. The core 31 is provided in the tip portion of the electronic pen 3. The core 31 is energized toward the tip of the electronic pen 3 by an elastic member that is not shown in the drawings. The tip portion of the core 31 protrudes to the outside of the electronic pen 3. The back end of the core 31 is connected to the ink storage portion 36 which stores the ink. The ink storage portion 36 supplies the ink to the core 31. When the user uses the electronic pen 3 to write, the written text is formed by the ink.

The coil 32 is held between the core 31 and the variable capacitor 33 in a state in which the coil 32 is wound around the ink storage portion 36. The variable capacitor 33 is fixed in place in the interior of the electronic pen 3 by the circuit board 34. The capacitor 35 is mounted on the circuit board 34. The capacitor 35 and the variable capacitor 33 are connected in parallel with the coil 32 to configure a known resonance circuit.

The paper medium 100 can be opened to the left and right. In the paper medium 100, a pair of covers (a front cover 110L and a back cover 110R) and a plurality of the forms 120 are bound along portions of respective edges of the pair of covers and the plurality of the forms 120. For example, the paper medium 100 may be an A5 size notebook. The paper medium 100 is mounted on the reading device 2 such that the front cover 110L is placed on the top face of the sensor circuit board 7L and the back cover 110R is placed on the top face of the sensor circuit board 7R. In a state in which the paper medium 100 is mounted on the reading device 2, the user can enter text on the forms 120 by using the electronic pen 3. Position information on the electronic pen 3 that enters the text on the paper medium 100 is detected by whichever of the sensor circuit boards 7L, 7R is facing the form 120 on which the text is entered.

Figure 2:
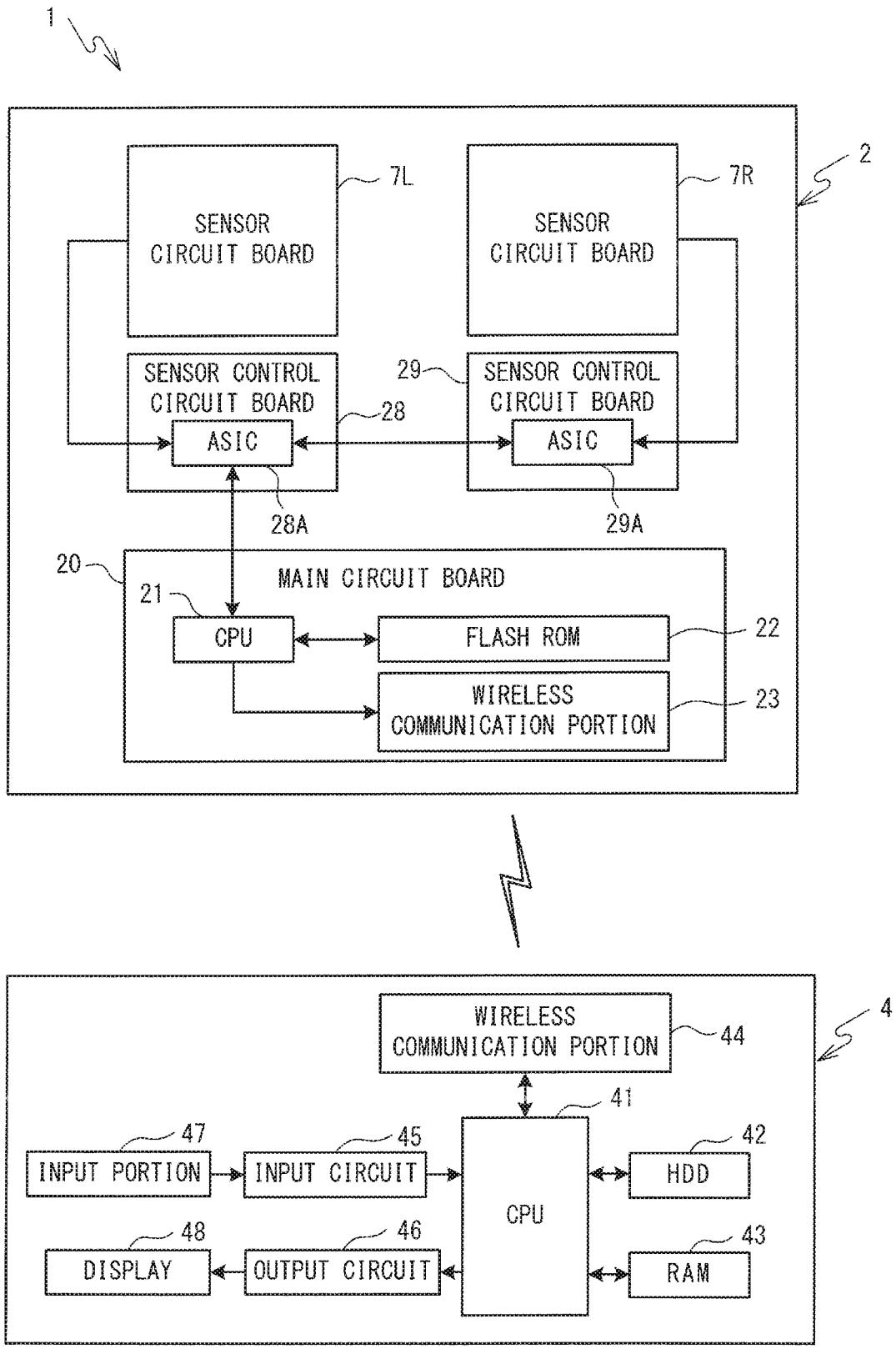
FIG. 2 is a diagram that shows an electrical configuration of the handwriting input system.

An electrical configuration of the handwriting input system 1 will be explained with reference to FIG. 2. The electrical configuration of the reading device 2 will be explained. The reading device 2 is provided with the sensor circuit boards 7L, 7R, a main circuit board 20, and sensor control circuit boards 28, 29.

The main circuit board 20 is provided with a CPU 21, a flash ROM 22, and a wireless communication portion 23. The flash ROM 22 and the wireless communication portion 23 are electrically connected to the CPU 21. The CPU 21 performs control of the reading device 2. Various types of programs that the CPU 21 executes to control the reading device 2 are stored in the flash ROM 22. The stroke data are also are stored in the flash ROM 22. When the electronic pen 3 is used to enter text on the paper medium 100 on the sensor circuit boards 7L, 7R, the track of the electronic pen 3 is detected by the sensor circuit boards 7L, 7R as a plurality of sequentially detected positions. By describing the plurality of positions, the stroke data describe the track of the electronic pen 3. The stroke data include coordinate information that describes each one of the plurality of positions on the track. The wireless communication portion 23 is a controller for performing near field communication with an external electronic device.

The sensor circuit board 7L is electrically connected to an ASIC 28A of the sensor control circuit board 28. In a case where an entering operation is performed by the electronic pen 3 on the sensor circuit board 7L, the ASIC 28A acquires the stroke data based on the entering operation. This will be described in detail later. The sensor circuit board 7R is electrically connected to an ASIC 29A of the sensor control circuit board 29. In a case where an entering operation is performed by the electronic pen 3 on the sensor circuit board 7R, the ASIC 29A acquires the stroke data based on the entering operation. This will be described in detail later. The ASIC 28A is the master and is connected directly to the CPU 21, while the ASIC 29A is the slave and is connected to the CPU 21 through the ASIC 28A.

The principles by which the stroke data are acquired in a case where an entering operation is performed by the electronic pen 3 on the sensor circuit boards 7L, 7R will be explained schematically. The CPU 21 controls the ASICs 28A, 29A such that the ASICs 28A, 29A cause a current of a specific frequency to flow through each of the loop coils in the corresponding one of the sensor circuit boards 7L, 7R one at a time. This causes a magnetic field to be generated by each one of the loop coils in the sensor circuit boards 7L, 7R. In this state, if the user uses the electronic pen 3 to perform an operation of entering text on the paper medium 100 that is affixed to the reading device 2, for example, the electronic pen 3 will come close to one of the sensor circuit boards 7L, 7R. The resonance circuit of the electronic pen 3 therefore resonates due to electromagnetic induction and generates an induced magnetic field.

Next, the CPU 21 controls the ASICs 28A, 29A such that the ASICs 28A, 29A stop the generating of the magnetic fields by the individual loop coils in the sensor circuit boards 7L, 7R. Each one of the loop coils in the sensor circuit boards 7L, 7R receives the induced magnetic field that is generated by the resonance circuit of the electronic pen 3. The CPU 21 controls the ASICs 28A, 29A such that the ASICs 28A, 29A detect reception currents that flow through the individual loop coils in the sensor circuit boards 7L, 7R. The ASICs 28A, 29A perform this operation for all of the loop coils one at a time. In this manner, the positions of the electronic pen 3 are detected in the form of the coordinate information, based on the reception currents.

Furthermore, in a state in which the electronic pen 3 is entering text on the paper medium 100, a writing pressure is imparted to the core 31. The inductance in the coil 32 varies according to the writing pressure that is imparted to the core 31. This causes the resonance frequency of the resonance circuit of the electronic pen 3 to vary. The CPU 21 detects the changes in the resonance frequency and specifies the writing pressure that is imparted to the core 31. This enables the CPU 21 to determine, according to the specified writing pressure of the electronic pen 3, whether or not text is being entered on the paper medium 100. In a case where the CPU 21 has determined that text is being entered on the paper medium 100, the CPU 21 acquires, from the ASICs 28A, 29A, the stroke data that include the coordinate information that describe the positions of the electronic pen 3. The CPU 21 then stores the acquired stroke data in the flash ROM 22.

The reading device 2 may also detect the positions of the electronic pen 3 by another method. For example, the reading device 2 may also be provided with a touch panel. It is preferable for the touch panel drive system to be a resistive film system. The paper medium 100 may be placed on top of the touch panel. In a case where an operation of entering text on the paper medium 100 has been performed by the electronic pen 3, the CPU 21 may detect, through the touch panel, the positions where the writing pressure has been applied.

An electrical configuration of the PC 4 will be explained. The PC 4 is provided with a CPU 41 that performs control of the PC 4. The CPU 41 is electrically connected to a hard disk drive (HDD) 42, a RAM 43, a wireless communication portion 44, an input circuit 45, and an output circuit 46. Various types of programs that the CPU 41 executes and various types of data are stored in the HDD 42. A program for performing main processing (refer to FIG. 5), which will be described later, is also stored in the HDD 42.

The PC 4 is provided with a media reading device (for example, a CD-ROM drive) that is not shown in the drawings. By using the media reading device to read a program that is stored in a storage medium (for example, a CD-ROM), the PC 4 is able to install the program on the HDD 42. The CPU 41 may also receive a program from an external device (not shown in the drawings) that is connected to the PC 4, or from a network, and install the program on the HDD 42.

The RAM 43 stores various types of data temporarily. The wireless communication portion 44 is a controller for performing near field communication with an external electronic device. The input circuit 45 sends commands to the CPU 41 from an input portion 47 (for example, a mouse, a keyboard, a touch panel, or the like). The output circuit 46 displays an image on a display 48 in response to a command from the CPU 41.

The wireless communication portion 23 of the reading device 2 and the wireless communication portion 44 of the PC 4 are able to perform near field communication with one another. The reading device 2 transmits the stroke data that are stored in flash ROM 22 to the PC 4 by near field communication. In a case where the stroke data are transmitted from the reading device 2 to the PC 4, the communication is not limited to near field communication and may also be wired communication.

A form 700, which is one example of the forms 120 in the paper medium 100, will be explained with reference to FIG. 3. The bottom side, the top side, the left side, and the right side in FIG. 3 respectively correspond to the front side, the rear side, the left side, and the right side of the form 700. The front-rear direction, or what is basically the front-rear direction, of the form 700 will sometimes be called the vertical direction. The left-right direction, or what is basically the left-right direction, of the form 700 will sometimes be called the horizontal direction. The form 700 is one of the pages of the paper medium 100. The other pages of the paper medium 100 are not shown in the drawings.

Figure 3:
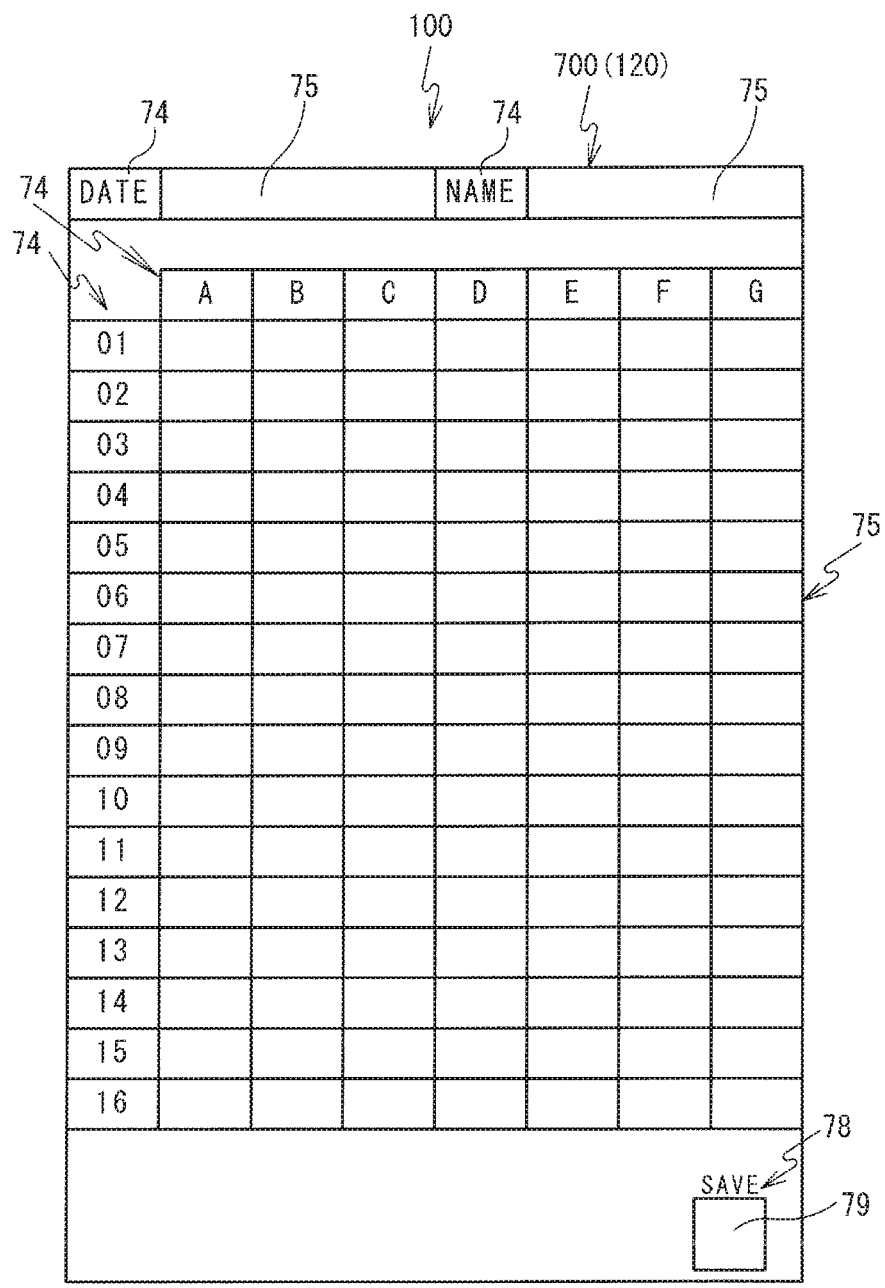
FIG. 3 is a figure that shows an example of a form on a paper medium.

As shown in FIG. 3, label fields 74, entry frames 75, and a check field 79 are provided on the form 700. The labels "DATE", "NAME", "01" to "16", and "A" to "G" are printed in the label fields 74. The entry frames 75 are rectangular and a plurality of the entry frames 75 is provided. More specifically, one of the entry frames 75 is provided to the right of each one of the label fields 74 "DATE" and "NAME". A plurality of the entry frames 75 are provided toward the front from the label fields 74 "A" to "G" and to the right of the label fields 74 "01" to "16". The check field 79 is square and is provided in the right front portion of the form 700. A character string 78 that says "SAVE" is printed above the top side of the check field 79.

Figure 4:
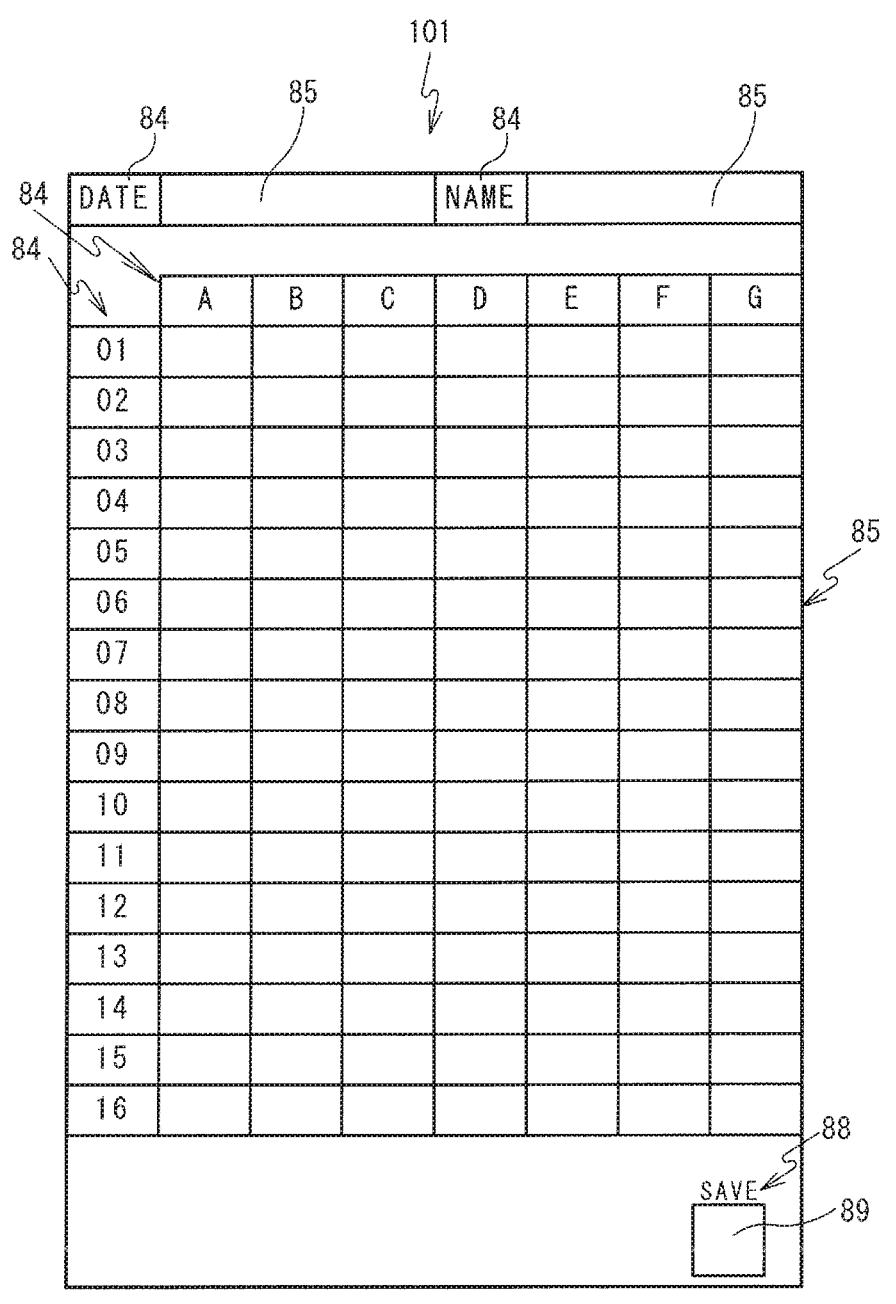

Paper medium data, which are data that correspond to the paper medium 100 (refer to FIG. 3), will be explained with reference to FIG. 4. The paper medium data are stored on the HDD 42. A paper medium 101 that is shown in FIG. 4 is a paper medium that is described by the paper medium data. Data for an aggregation of coordinate information for label fields 84, entry frames 85, a character string 88, and a check field 89 are included in the paper medium data. The label fields 84, the entry frames 85, the character string 88, and the check field 89 respectively correspond to the label fields 74, the entry frames 75, the character string 78, and the check field 79 on the paper medium 100 (refer to FIG. 3). The coordinate information corresponds to the coordinate information on the sensor circuit board 7L. In a state in which the outer edge of the paper medium 100 is congruent with the outer edge of the sensor circuit board 7L, the coordinates on the sensor circuit board 7L that correspond to the label fields 74, the entry frames 75, the character string 78, and the check field 79 on the paper medium 100 respectively match the coordinates of the label fields 84, the entry frames 85, the character string 88, and the check field 89 that are described by the paper medium data. For example, in a case where an image of the paper medium 101 that is described by the paper medium data is displayed on the display 48 or is printed, the image that is shown in FIG. 4 is displayed or printed. The coordinates in the left-right direction of the paper medium 101 in FIG. 4 are defined as the X coordinates, and the coordinates in the front-rear direction are defined as the Y coordinates. The rightward direction and the rearward direction are the positive directions, and the leftward direction and the frontward direction are the negative directions.

The main processing will be explained with reference to FIG. 5. The main processing is processing that performs position correction and the like for the tracks that are described by the stroke data. The user operates the input portion 47 to input a command that launches an application for performing the main processing. From the HDD 42, the CPU 41 of the PC 4 reads a program for executing the application and loads the program into the RAM 43. The program that the CPU 41 uses to perform the main processing is included in the program that has been loaded into the RAM 43. The CPU 41 performs the main processing in accordance with the commands of the program. In a case where the user operates the input portion 47 to input a command to terminate the application for performing the main processing, the CPU 41 terminates the main processing.

Figure 6:
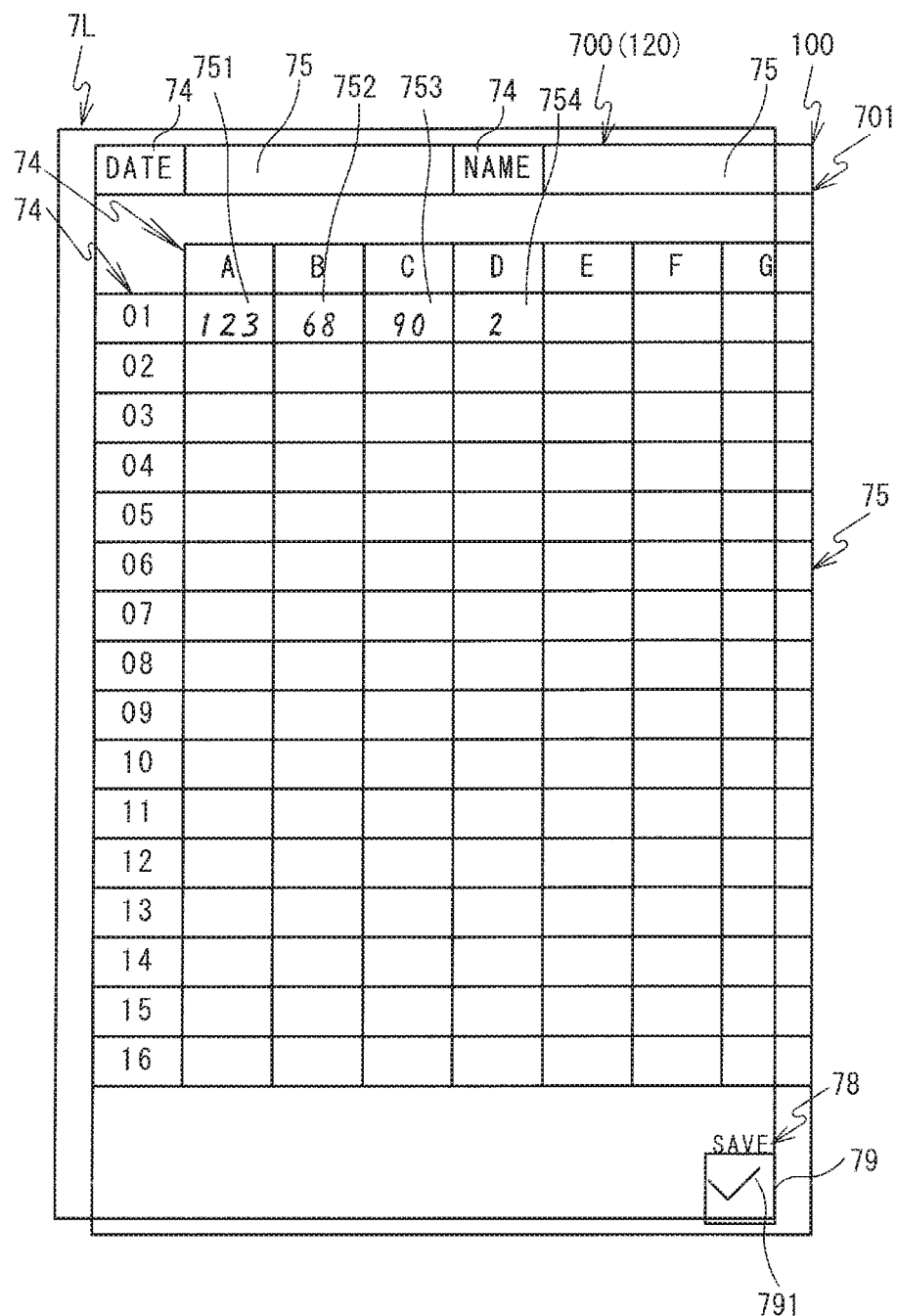
FIG. 6 is a figure that shows a state in which the form on the paper medium is disposed on a sensor circuit board.

In the explanation that follows, a case in which the user makes entries on the form 700 of the paper medium 100, as shown in FIG. 6, will be used as a specific example. In the specific example, the user opens the pages of the paper medium 100 and places the form 700 on the sensor circuit board 7L. At this time, the form 700 is misaligned toward the right front in relation to the sensor circuit board 7L. Using the electronic pen 3, the user enters text in entry frames 751 to 754 of the form 700. The entry frames 751 to 754 are entry frames that are toward the front from the label fields 84 "A" to "D" and to the right of the label field 84 "01". The user enters text sets "123", "68", "90", and "2" in the entry frames 751 to 754, respectively. Thereafter, the user uses the electronic pen 3 to enter a check mark 791 in the check field 79.

Figure 5:
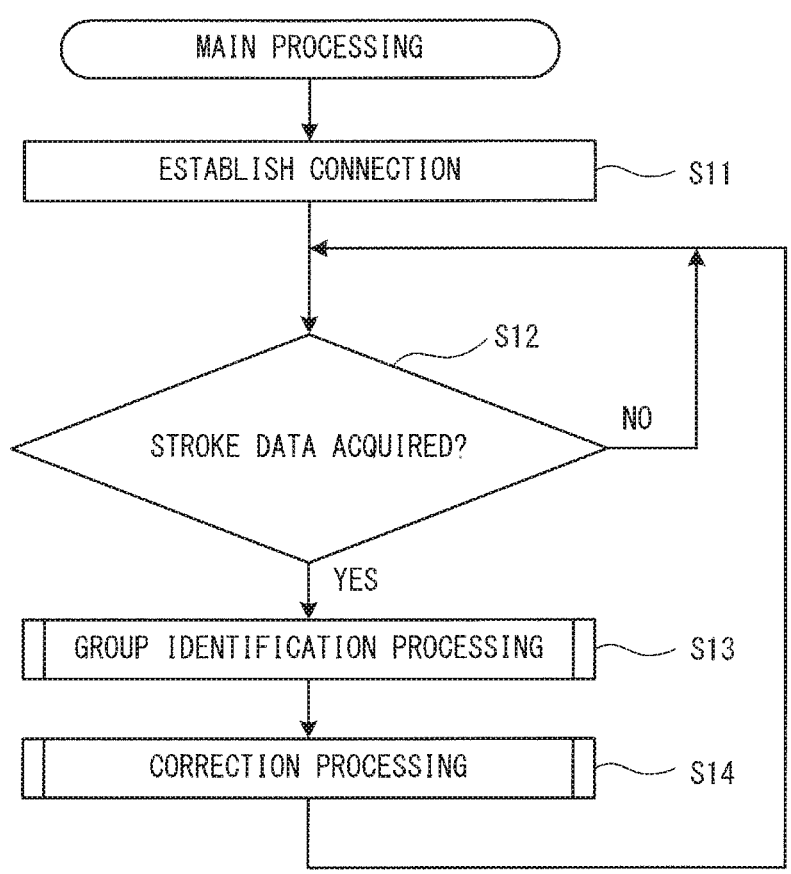
FIG. 5 is a flowchart of main processing.

As shown in FIG. 5, the CPU 41 establishes a connection with the CPU 21 of the reading device 2 through the wireless communication portions 23, 44. The CPU 41 establishes a state in which communication with the CPU 21 of the reading device 2 is enabled (Step S11). Next, the CPU 41 determines whether or not the stroke data have been acquired (Step S12). In a case where the stroke data have not been acquired (NO at Step S12), the CPU 41 repeats Step S12.

As the user makes entries on the form 700, the CPU 21 of the reading device 2 acquires the stroke data and stores the stroke data in the flash ROM 22. In a case where the CPU 21 has determined that a check mark 791 has been entered in a position that corresponds to the check field 79, the CPU 21 transmits the stroke data that are stored in the flash ROM 22 to the CPU 41 of the PC 4. In a case where the CPU 41 of the PC 4 has acquired the transmitted stroke data (YES at Step S12), the CPU 41 performs group identification processing (Step S13). Note that, as shown in FIG. 6, the text sets "123", "68", "90", and "2" have been entered in the entry frames 751 to 754, respectively, in a central region in the left-right direction. However, because the form 700 has been placed on the sensor circuit board 7L in a state of misalignment toward the right front, the tracks for the text sets "123", "68", "90", and "2", which are described by the stroke data that were acquired at Step S12, are in a state of misalignment toward the right front from entry frames 851 to 854 that are described by entry frame data that are included in the paper medium data, as shown in FIG. 7.

The group identification processing will be explained with reference to FIG. 8. From among the plurality of tracks that are described by the stroke data that were acquired at Step S12, the group identification processing identifies, as a group, the tracks that are not greater than a specified distance from one another. In the explanation that follows, various types of data, such as various types of variables, groups of tracks, and the like, are created, set, and the like, and all of those data are stored in whichever of the RAM 43 and the HDD 42 is deemed appropriate.

The CPU 41 sets a variable N to 2 and sets a variable M to 1 (Step S21). The CPU 41 determines whether or not the distance between an N-th track and an (N−1)-th track is not greater than a specified distance (Step S22). In a case where the distance between the N-th track and the (N−1)-th track is not greater than the specified distance (YES at Step S22), the CPU 41 determines whether or not the CPU 41 has checked all of the tracks at Step S22 (Step S25). In a case where at least one of the tracks remains unchecked (NO at Step S25), the CPU 41 increments the variable N by 1 (Step S26). The CPU 41 returns the processing to Step S22.

Figure 7:
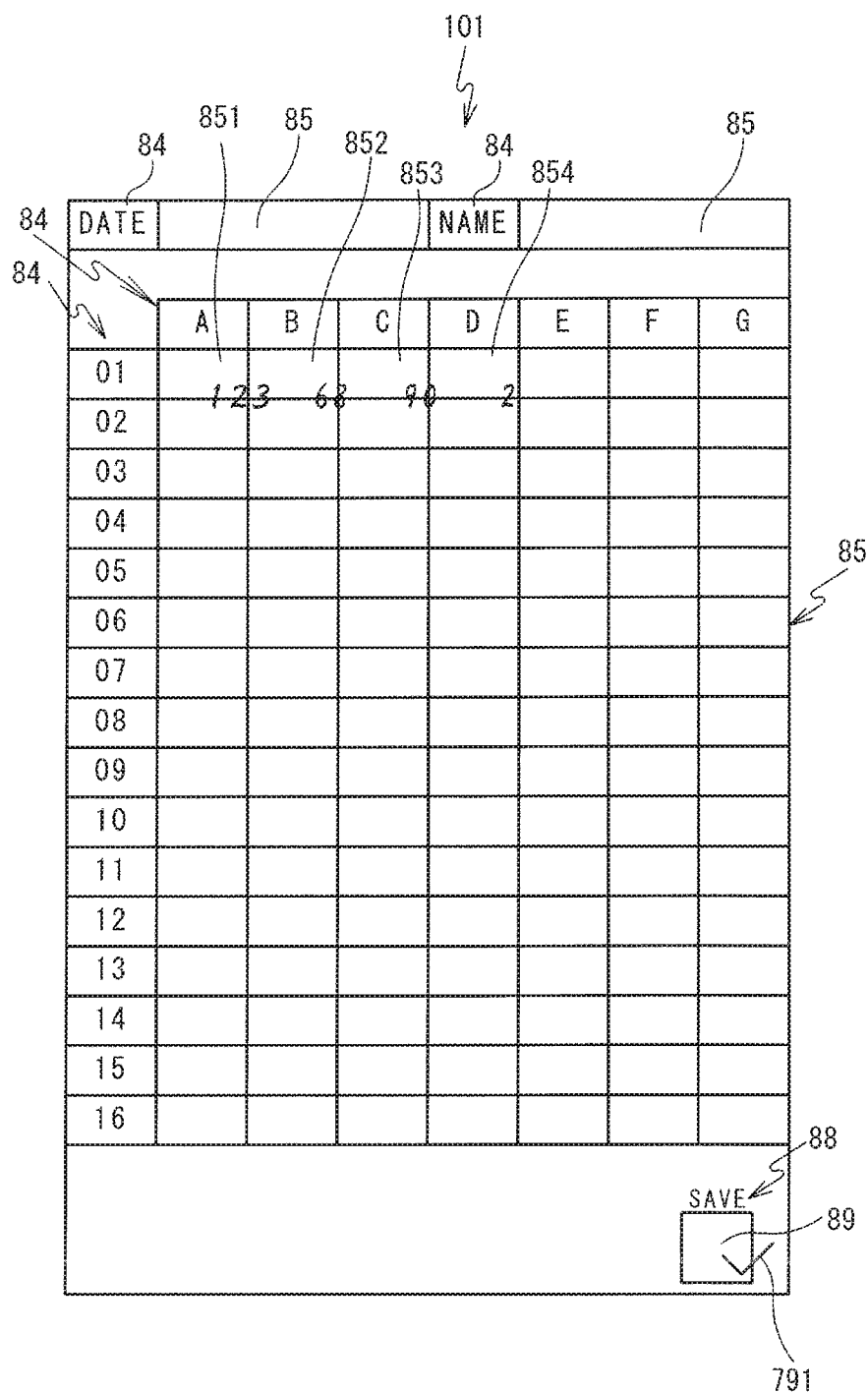
FIG. 7 is an image in which a track that is described by stroke data is superimposed on the image of the paper medium that is described by the paper medium data.
Figure 9A:
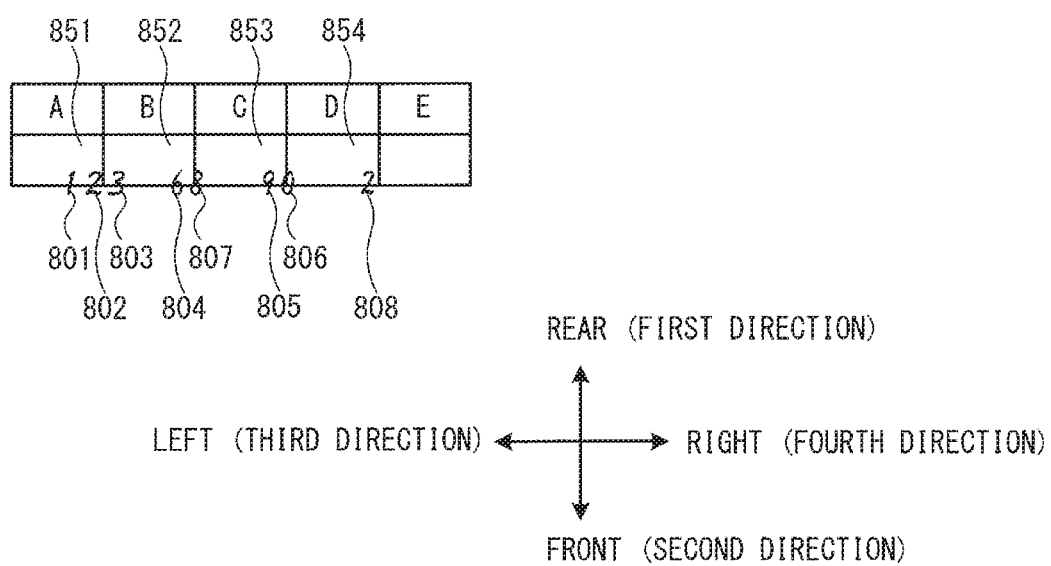
FIG. 9A is a state transition diagram for the track in the main processing.
Figure 9B:
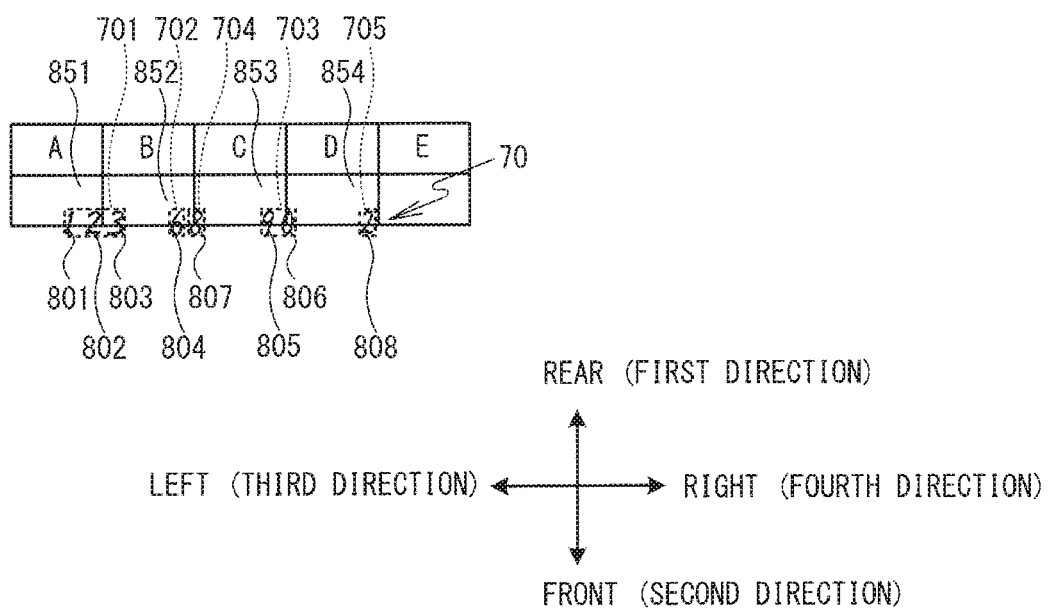
FIG. 9B is a state transition diagram for the track in the main processing.
Figure 9C:
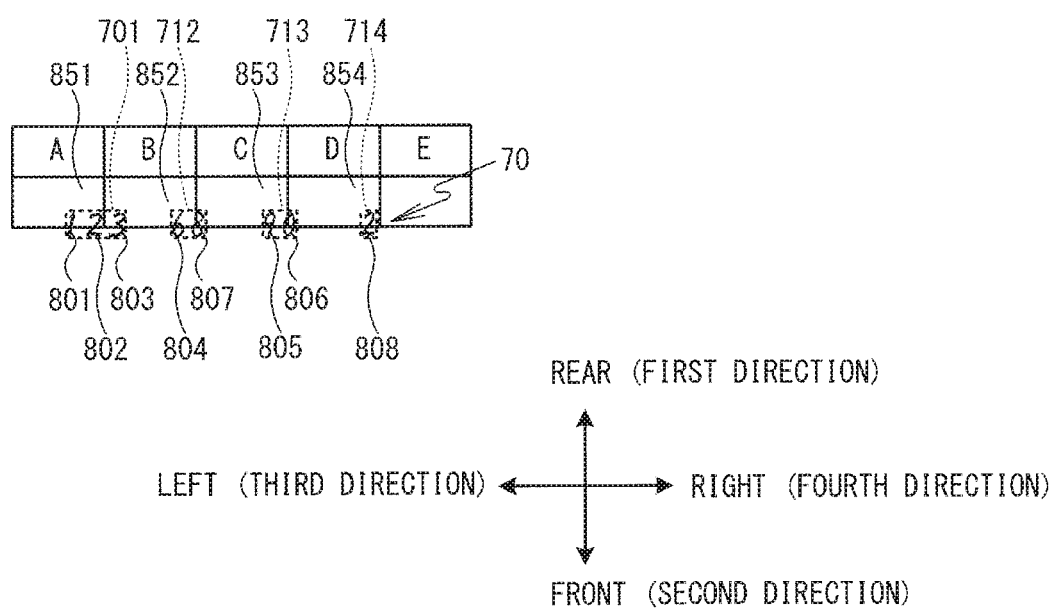
FIG. 9C is a state transition diagram for the track in the main processing.

FIGS. 9A to 9C are figures in which tracks that are described by the stroke data have been entered such that they are superimposed on a portion of the image of the paper medium 101 that is shown in FIG. 7. In the specific example, the user has entered text in the form of tracks 801 to 808, in that order, which are shown in FIG. 9A and are described by the stroke data. The tracks 801 to 803 are the "1", "2", and "3" of the text set "123". The track 804 is the "6" of the text set "68". The tracks 805, 806 are the "9" and "0" of the text set "90". The track 807 is the "8" of the text set "68". In other words, the "6" and "8" of the text set "68" have not been entered in sequential order. The track 808 is the text set "2".

The tracks "1", "2", and "3" of the text set "123" are defined as being not greater than the specified distance from one another. The tracks "6" and "8" of the text set "68" are defined as being not greater than the specified distance from one another. The tracks "9" and "0" of the text set "90" are defined as being not greater than the specified distance from one another. The tracks in each one of the text sets "123", "68", "90", and "2" are defined as being greater than the specified distance from the tracks in the other text sets.

In FIG. 9A, the distance between the second track 802 "2" and the first track 801 "1" is not greater than the specified distance. Therefore, in a case where the variable N is 2, the CPU 41 determines that the distance between the second track 802 and the first track 801 is not greater than the specified distance (YES at Step S22). At least one of the tracks remains unchecked (NO at Step S25), so the CPU 41 sets the variable N to 3 (Step S26) and returns the processing to Step S22. The CPU 41 determines that the distance between the third track 803 "3" and the second track 802 "2" is not greater than the specified distance (YES at Step S22), so the CPU 41 sets the variable N to 4 (NO at Step S25; Step S26) and returns the processing to Step S22.

The CPU 41 determines that the distance between the fourth track 804 "6" and the third track 803 "3" is greater than the specified distance (NO at Step S22). The CPU 41 groups the tracks up to the (N−1)-th track into an M-th group (where M is the value of the variable M) (Step S23). In the specific example, the tracks from the first track 801 "1" to the third track 803 "3" are grouped into a first group 701, as shown in FIG. 9B (Step S23). In FIGS. 9B to 9C, the groups that have been grouped are drawn with broken lines surrounding them. The CPU 41 increments the variable M by 1 (Step S24) and advances the processing to Step S25.

In the specific example, the repetition of the processing at Steps S22 to S26 results in the grouping of a second group 702 "6", a third group 703 "90", and a fourth group 704 "8". The user has entered the track 804 "6", the track 805 "9", the track 806 "0", and the track 807 "8" in that order. Therefore, the result of the processing at Steps S22 to S26 is that the track 804 "6" and the track 807 "8" are separated into the two different groups 702, 704, even though the groups 702, 704 are not greater than the specified distance from one another. The track 804 "6" and the track 807 "8" that are separated into the two different groups 702, 704 will be grouped by processing at Steps S28 to S33, which will be described later.

Figure 8:
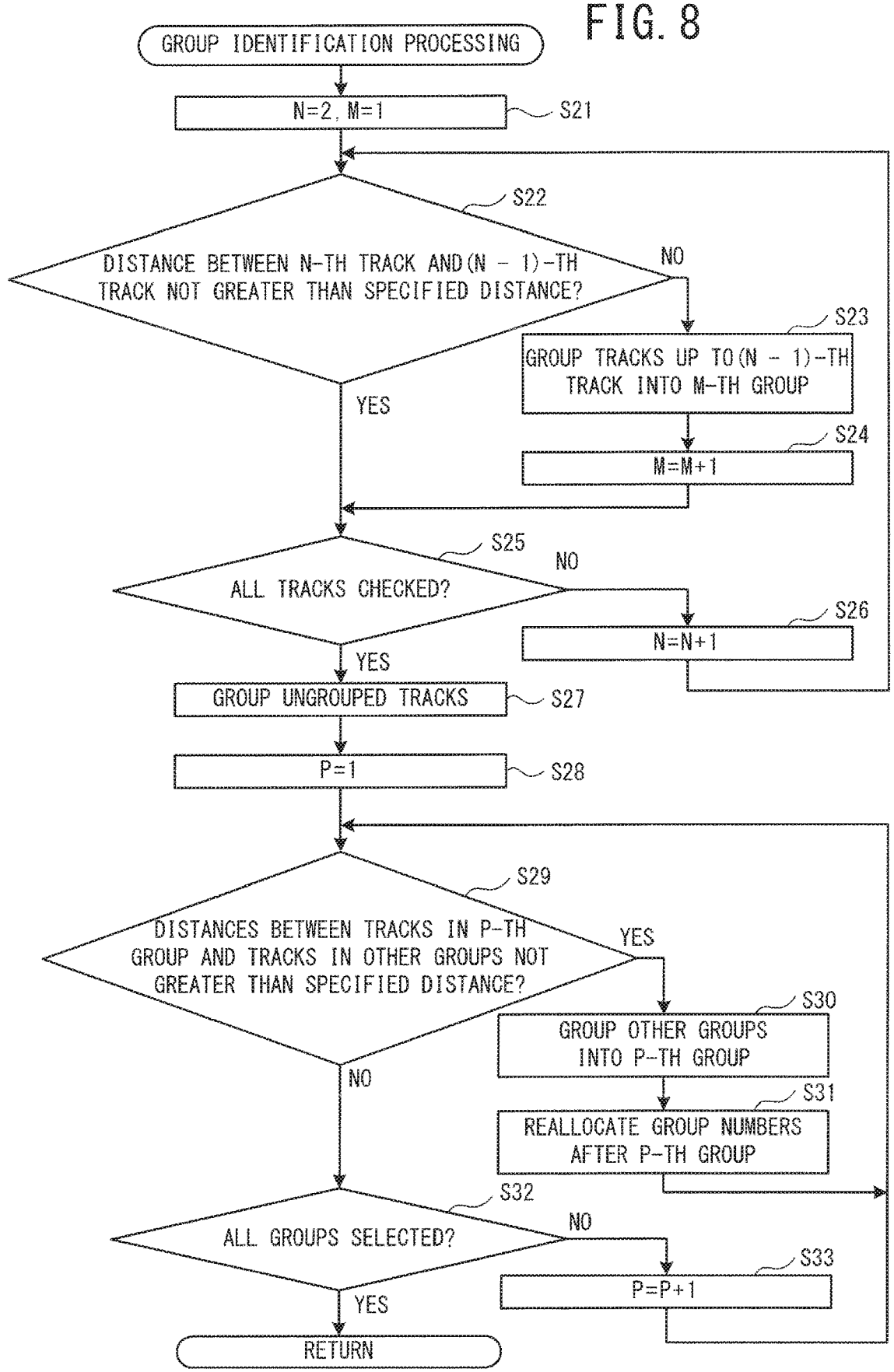
FIG. 8 is a flowchart of group identification processing.

As shown in FIG. 8, in a case where the CPU 41 has checked all of the tracks (YES at Step S25), the CPU 41 groups any ungrouped tracks (Step S27). The result, as shown in FIG. 9B, is that the track 808 "2" is grouped into a fifth group 705.

Next, the CPU 41 sets a variable P to 1 (Step S28). The CPU 41 selects the P-th group. The CPU 41 determines whether or not the distances between the tracks in the P-th group and the tracks in the other groups are not greater than the specified distance (Step S29). In the specific example, in the case where the variable P is 1, the CPU 41 determines that the distances between the tracks 801 to 803 "123" in the first group 701 and the tracks in the other groups are greater than the specified distance (NO at Step S29). Next, the CPU 41 determines whether or not all of the groups have been selected at Step S29 (Step S32). In a case where at least one of the groups remains unselected (NO at Step S32), the CPU 41 increments the variable P by 1 (Step S33) and returns the processing to Step S29.

In a case where the variable P is 2, the CPU 41 determines that the distances between the track 804 "6" in the second group 702 and the track 807 "8" in the fourth group 704, which is a separate group, is not greater than the specified distance (YES at Step S29), as shown in FIG. 9B. Because the CPU 41 has determined at Step S29 that the tracks in the P-th group and the other group are not greater than the specified distance from one another, the CPU 41 groups the P-th group and the other group into the P-th group (Step S30). Next, the CPU 41 reallocates the group numbers for the groups that follow the P-th group and stores the new group numbers in the RAM 43 (Step S31).

In the specific example, the second group 702 "6" and the fourth group 704 "8" that are shown in FIG. 9B are grouped into a new second group 712 (Step S30), as shown in FIG. 9C. The track 804 "6" and the track 807 "8" are thus consolidated into a single group. The third group 703 is then established as a new third group 713, and the fifth group 705 is established as a new fourth group 714 (Step S31). After executing Step S31, the CPU 41 returns the processing to Step S29.

As shown in FIG. 8, the repeating of the processing at Steps S29 to S33 creates a state in which the first group 701 "123", the second group 712 "68", the third group 713 "90", and the fourth group 714 "2" have been identified, as shown in FIG. 9C. In a case where all of the groups have been selected (YES at Step S32), the CPU 41 returns the processing to the main processing. As shown in FIG. 5, the CPU 41 performs correction processing (Step S14). In the explanation that follows, in a case where the first to the fourth groups 701, 712, 713, 714 are referenced collectively, as well as where no one group is specified, the fourth groups 701, 712, 713, 714 will sometimes be called the groups 70.

The correction processing will be explained with reference to FIG. 10. The correction processing moves the groups 70 into the entry frames 85, which are described by the entry frame data that are included in the paper medium data. In the present embodiment, the entry frame data that are included in the paper medium data, which are stored on the HDD 42, are the entry frame data for the entry frames 85, which are rectangular. In the explanation that follows, as shown in FIG. 11A, the rearward direction is sometimes called the first direction, and the frontward direction, which is the opposite direction from the first direction, is sometimes called the second direction. Furthermore, the leftward direction is sometimes called the third direction, and the rightward direction, which is the opposite direction from the third direction, is sometimes called the fourth direction.

The CPU 41 sets a variable q to 1 (Step S41). The CPU 41 acquires a group region 90 that contains the q-th group (refer to FIG. 11A) (Step S42). The group region 90 is a region that contains one of the groups 70 that were specified at Step S13. In the present embodiment, the group region 90 that is acquired at Step S41 is a rectangular region. In the specific example, in a case where the variable q is 1, the group region 90 that contains the first group 701 is acquired, as shown in FIG. 11A. Specifically, among the coordinates for the tracks that are included in the first group 701, the position of the farthest Y coordinate in the first direction is defined as the position of a first direction edge 951, and the position of the farthest Y coordinate in the second direction is defined as the position of a second direction edge 952. The position of the farthest X coordinate in the third direction is defined as the position of a third direction edge 953, and the position of the farthest X coordinate in the fourth direction is defined as the position of a fourth direction edge 954. The region that is bounded by the edges 951 to 954 is acquired as the group region 90. Note that in FIG. 11A, the group region 90 is indicated by a rectangle drawn in solid lines.

The entry frame data that are included in the paper medium data describe the entry frames 85. As shown in FIG. 10, the CPU 41 determines whether or not any one of the entry frames 85 overlaps with the group region 90 that was acquired at Step S42 (Step S43). In a case where none of the entry frames 85 overlaps with the group region 90 (NO at Step S43), the CPU 41 advances the processing to Step S51, which will be described later.

In a case where at least one of the entry frames 85 does overlap with the group region 90 that was acquired at Step S42 (YES at Step S43), the CPU 41 selects the entry frame 85 that overlaps the most with the group region 90 (Step S44). In the specific example, the entry frame 851 in FIG. 11A, which overlaps the most with the group region 90, is selected.

The CPU 41 moves the group 70 that is contained in the group region 90 that was acquired at Step S42 into the entry frame 85 that was selected at Step S44 (Steps S44 to S50). This will be explained in detail below.

The CPU 41 determines whether or not the group region 90 that was acquired at Step S42 is within the entry frame 85 that was selected at Step S44 in the front-rear direction (Step S45). To explain this in detail using the specific example, the CPU 41 determines whether or not the Y coordinate of the first direction edge 951 of the group region 90 that is shown in FIG. 11A is not greater than the Y coordinate of a first direction edge 861 of the entry frame 851. The CPU 41 also determines whether or not the Y coordinate of the second direction edge 952 of the group region 90 is not less than the Y coordinate of a second direction edge 862 of the entry frame 851.

Figure 10:
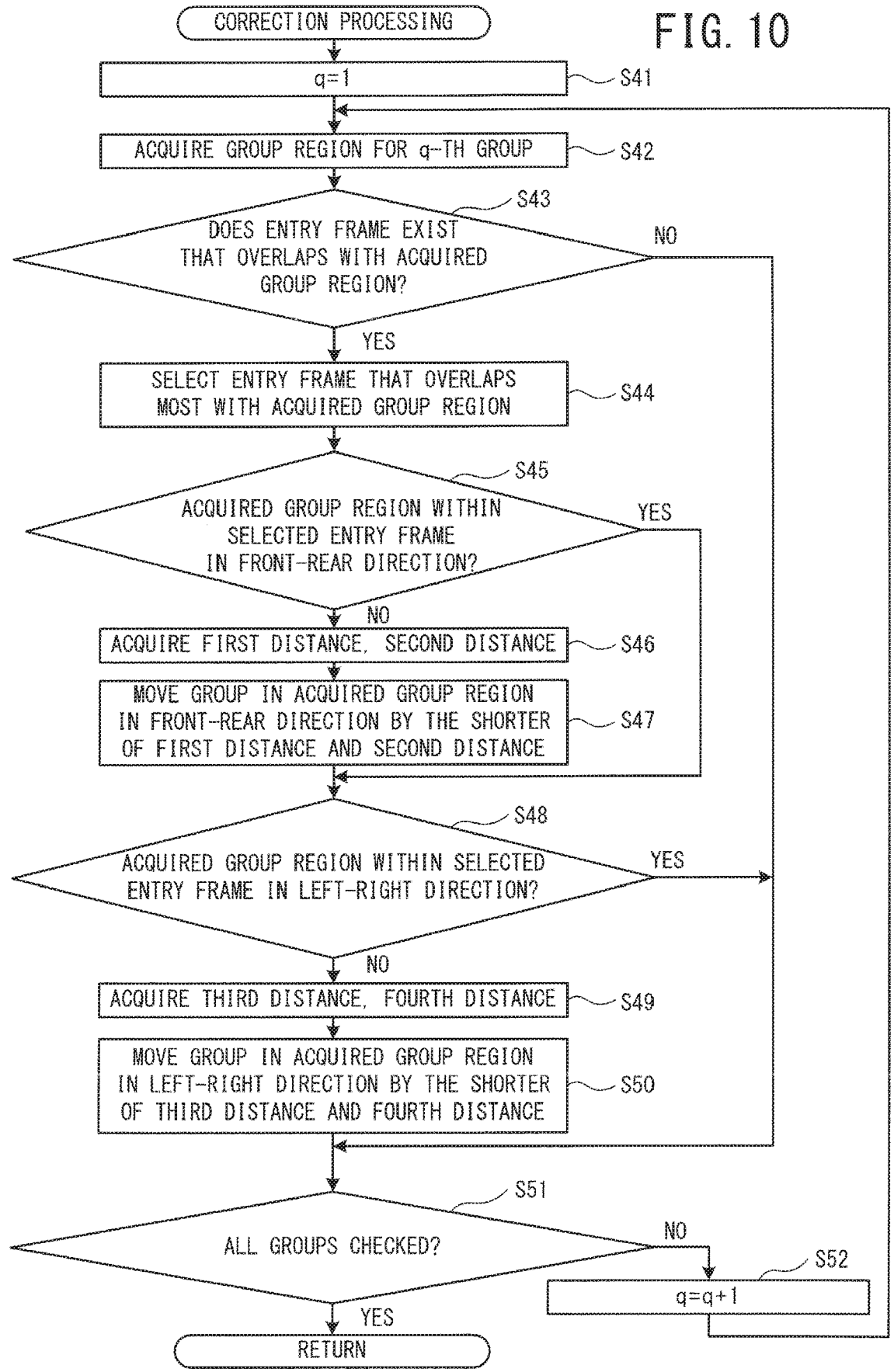
FIG. 10 is a flowchart of correction processing.
Figure 11A:
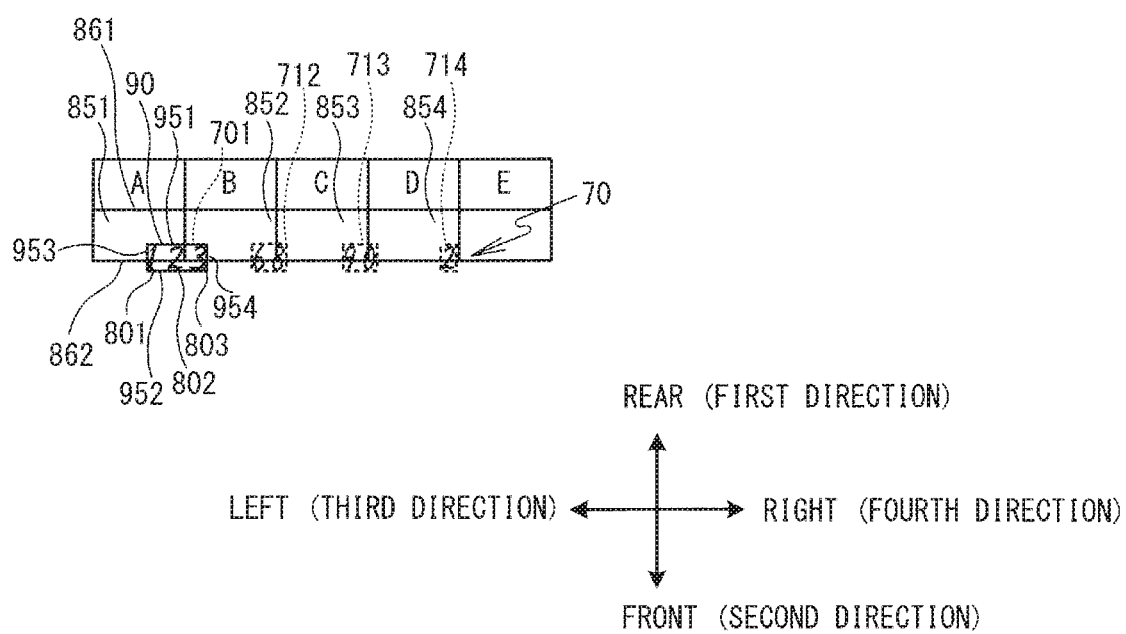
FIG. 11A is a state transition diagram for the track in the main processing.

As shown in FIG. 10, in a case where the group region 90 that was acquired at Step S42 is within the entry frame 85 that was selected at Step S44 in the front-rear direction (YES at Step S45), the CPU 41 advances the processing to Step S48, which will be explained later. In a case where the group region 90 that was acquired at Step S42 is not within the entry frame 85 that was selected at Step S44 in the front-rear direction (NO at Step S45), the CPU 41 acquires a first distance L1 and a second distance L2 (Step S46).

Figure 11B:
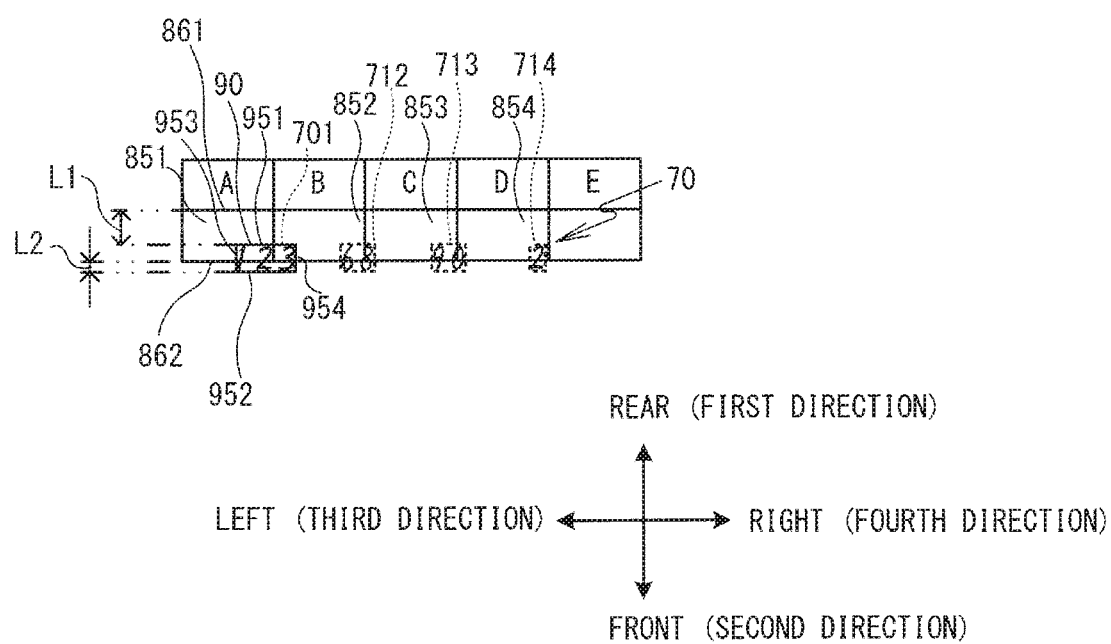
FIG. 11B is a state transition diagram for the track in the main processing.

In the specific example, as shown in FIG. 11B, the first distance L1 is the distance between the first direction edge 861 of the entry frame 851 that was selected at Step S44 and the first direction edge 951 of the group region 90 that was selected at Step S42. The second distance L2 is the distance between the second direction edge 862 of the entry frame 851 that was selected at Step S44 and the second direction edge 952 of the group region 90 that was selected at Step S42.

Figure 11C:
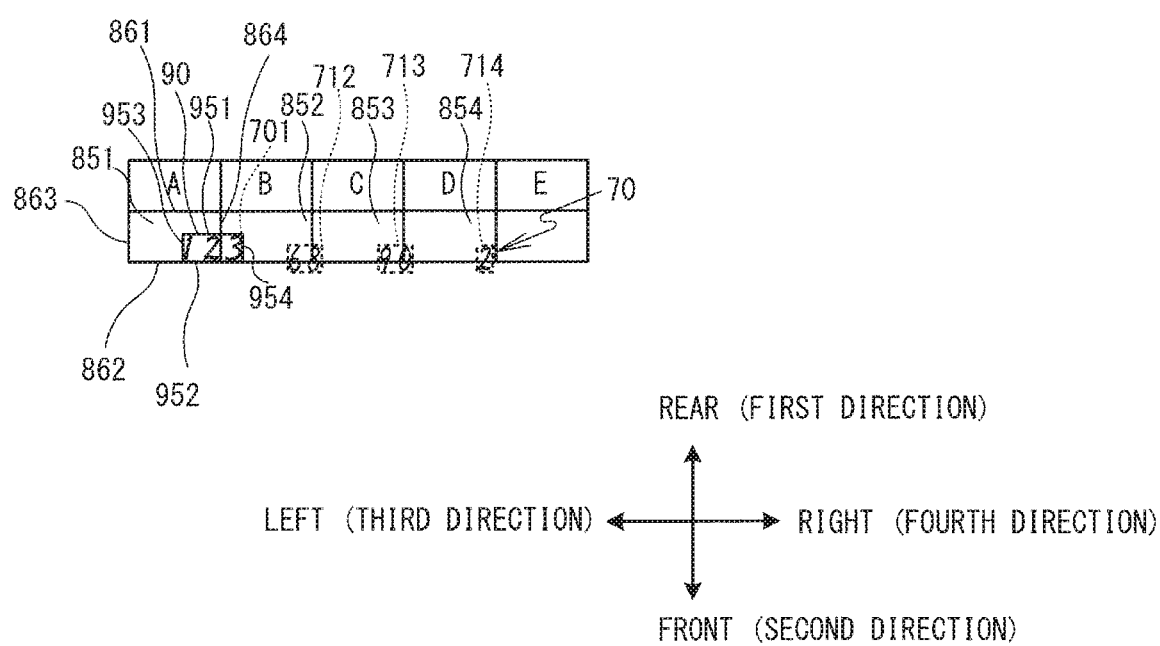
FIG. 11C is a state transition diagram for the track in the main processing.

As shown in FIG. 10, the CPU 41 moves the first group 701 which is contained in the group region 90 that was acquired at Step S42 in the front-rear direction by the shorter of the first distance L1 and the second distance L2 that were acquired at Step S46 (Step S47). In the specific example, as shown in FIG. 11B, the shorter of the first distance L1 and the second distance L2 is the second distance L2. Therefore, the CPU 41 moves the first group 701 in the first direction by the second distance L2. The first group 701 thus enters a state in which the first group 701 is positioned inside the entry frame 851 in the front-rear direction, as shown in FIG. 11C.

As shown in FIG. 10, the CPU 41 determines whether or not the group region 90 that was acquired at Step S42 is within the entry frame 85 that was selected at Step S44 in the left-right direction (Step S48). To explain this in detail, the CPU 41 determines whether or not the X coordinate of the third direction edge 953 of the group region 90 that is shown in FIG. 11C is not less than the X coordinate of a third direction edge 863 of the entry frame 851. The CPU 41 also determines whether or not the X coordinate of the fourth direction edge 954 of the group region 90 is not greater than the X coordinate of a fourth direction edge 864 of the entry frame 851.

In a case where the group region 90 that was acquired at Step S42 is within the entry frame 85 that was selected at Step S44 in the left-right direction (YES at Step S48), the CPU 41 advances the processing to Step S51. In a case where the group region 90 that was acquired at Step S42 is not within the entry frame 85 that was selected at Step S44 in the left-right direction (NO at Step S48), the CPU 41 acquires a third distance L3 and a fourth distance L4 (Step S49).

Figure 11D:
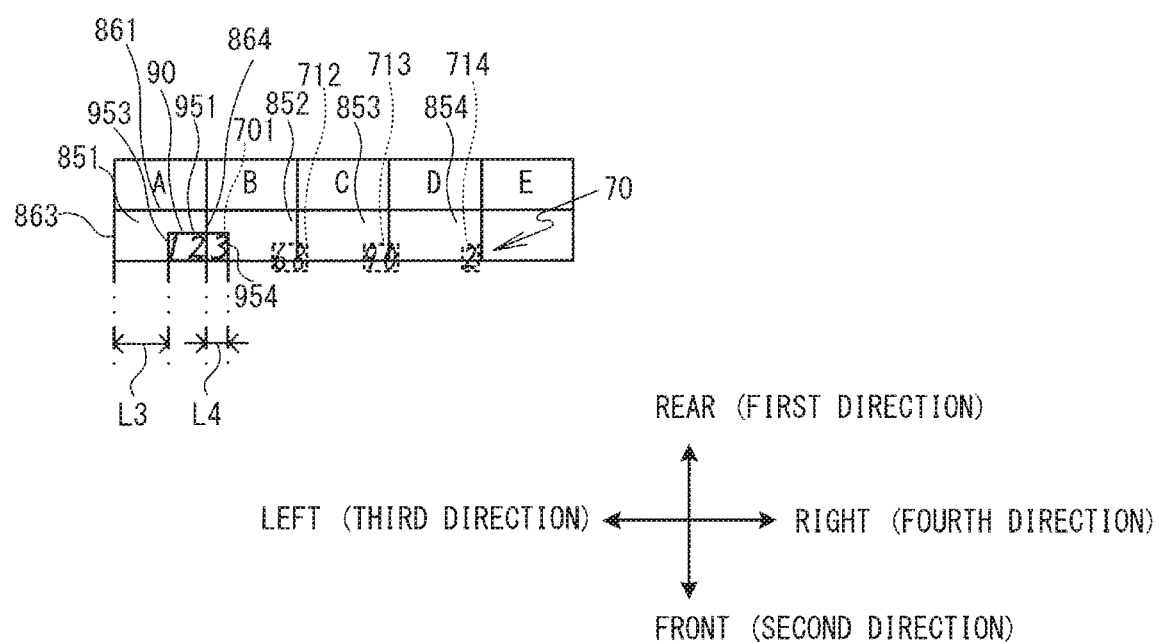
FIG. 11D is a state transition diagram for the track in the main processing.

As shown in FIG. 11D, the third distance L3 is the distance between the third direction edge 863 of the entry frame 851 that was selected at Step S44 and the third direction edge 953 of the group region 90 that was selected at Step S42. The fourth distance L4 is the distance between the fourth direction edge 864 of the entry frame 851 that was selected at Step S44 and the fourth direction edge 954 of the group region 90 that was selected at Step S42.

As shown in FIG. 10, the CPU 41 moves the first group 701, which is contained in the group region 90 that was acquired at Step S42, in the left-right direction by the shorter of the third distance L3 and the fourth distance L4 that were acquired at Step S49 (Step S50). In the specific example, as shown in FIG. 11D, the shorter of the third distance L3 and the fourth distance L4 is the fourth distance L4. Therefore, the CPU 41 moves the first group 701 in the third direction by the fourth distance L4. The first group 701 thus enters a state in which it is positioned inside the entry frame 851 in the left-right direction, as shown in FIG. 11E.

As shown in FIG. 10, the CPU 41 determines whether or not the group regions 90 have been acquired at Step S42 for all of the groups 70 (Step S51). In a case where at least one of the groups 70 remains for which the group region 90 has not been acquired (NO at Step S51), the CPU 41 increments the variable q by 1 (Step S52) and returns the processing to Step S42. The repeating of the processing at Steps S42 to S52 creates a state in which the tracks that are contained in the first to the fourth groups 701, 712, 713, 714 are respectively positioned inside the entry frames 851 to 854, as shown in FIG. 12. The stroke data for the tracks that are contained in the first to the fourth groups 701, 712, 713, 714 that are respectively positioned inside the entry frames 851 to 854 are stored on the HDD 42.

As shown in FIG. 10, in a case where the group regions 90 have been acquired at Step S42 for all of the groups 70 (YES at Step S51), the CPU 41 returns the processing to Step S12 of the main processing (refer to FIG. 5).

As described above, based on the entry frames 85, which are described by the entry frame data that are included in the paper medium data, and on the positions of the tracks, which are described by the stroke data, the PC 4 of the present embodiment is able to correct any misalignment of the tracks that are described by the stroke data and can move the tracks into the corresponding entry frames 85 (refer to FIGS. 9A and 12). This increases the possibility that the group 70 can be moved into the entry frame 85 where the user intended it to be than would be the case if the entry frame 85 into which the group 70 was moved was not the entry frame 85 with the greatest amount of overlap with the group region 90. This also makes it unnecessary to provide a reference mark on the paper medium, as is conventionally done. Accordingly, it is not necessary to set aside space on the paper medium for providing the reference mark, so the space on the paper medium can be utilized more effectively. Convenience for the user is also improved, because the time and effort required of the user to make entries along the reference mark is eliminated.

The PC 4 moves the group 70 in the front-rear direction by the shorter of the first distance L1 and the second distance L2 and moves the group 70 in the left-right direction by the shorter of the third distance L3 and the fourth distance L4. This makes it possible for the PC 4 to move the tracks that are contained in the group 70 into the entry frame 85 (Steps S45 to S50). Therefore, the PC 4 is able to move the tracks that are contained in the group 70 into the entry frame 85 with less movement than would be the case if the PC 4 were to move the group 70 in the front-rear direction by the longer of the first distance L1 and the second distance L2 and move the group 70 in the left-right direction by the longer of the third distance L3 and the fourth distance L4. The PC 4 is also able to move the tracks that are contained in the group 70 into the entry frame 85 with less movement than would be the case if the PC 4 were to move the group 70 such that the center of the group region 90 that was acquired at Step S42 is moved to the same position as the center of the entry frame 85 that was selected at Step S44.

Figure 13:
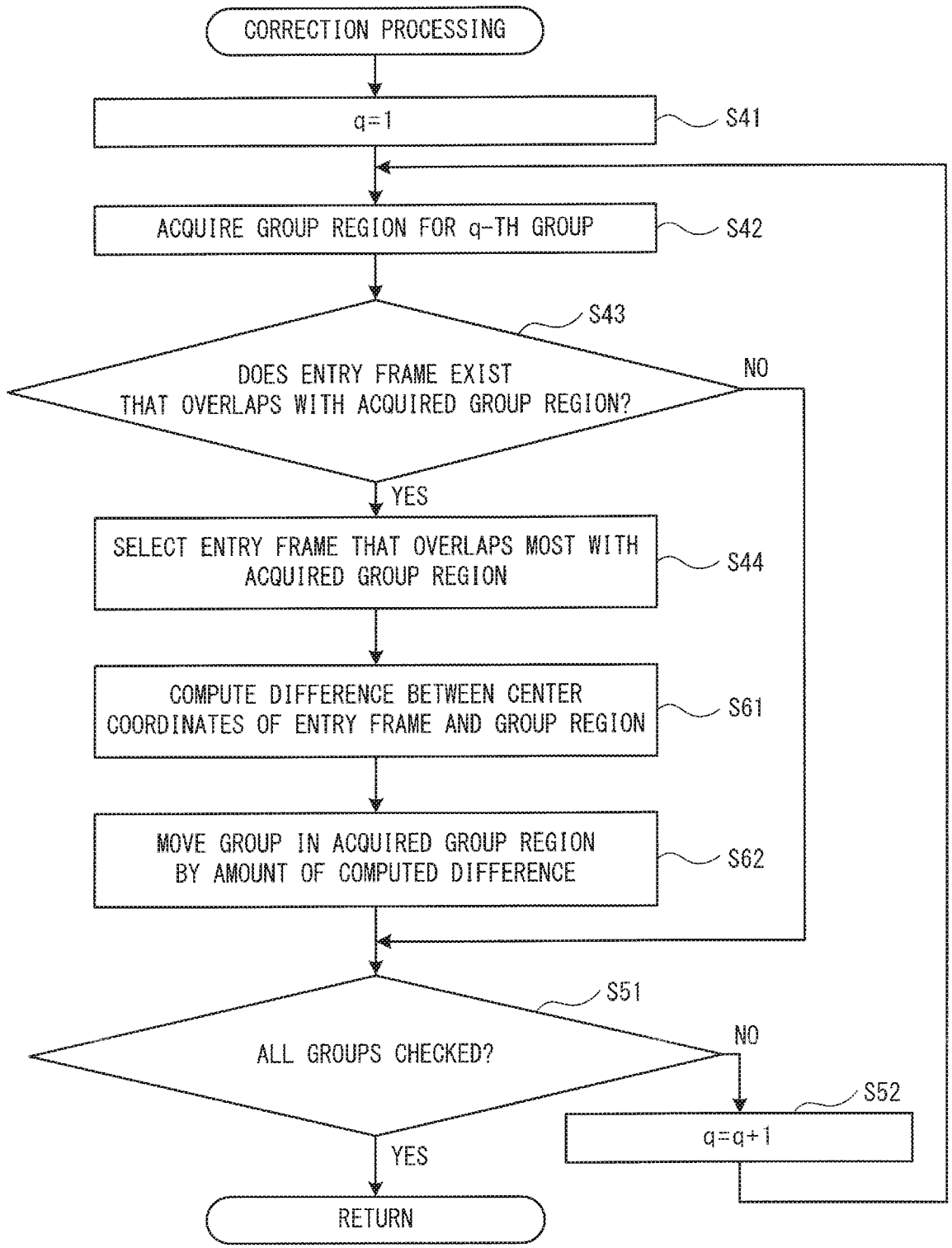
FIG. 13 is a flowchart of the correction processing in a second embodiment.

The present disclosure is not limited to the embodiment that is described above, and various types of modifications can be made. The method for moving the group 70 into the entry frame 85 is not limited to the method in the embodiment that is described above. The CPU 41 may also move the group 70 such that the center of the group region 90 that was acquired at Step S42 is moved to the same position as the center of the entry frame 85 that was selected at Step S44. Hereinafter, this modified example will be explained as a second embodiment. FIG. 13 is a modified example of the correction processing. In FIG. 13, the parts of the processing that are the same as in the first embodiment are indicated by the same step numbers, and a detailed explanation will be omitted.

Figure 14A:
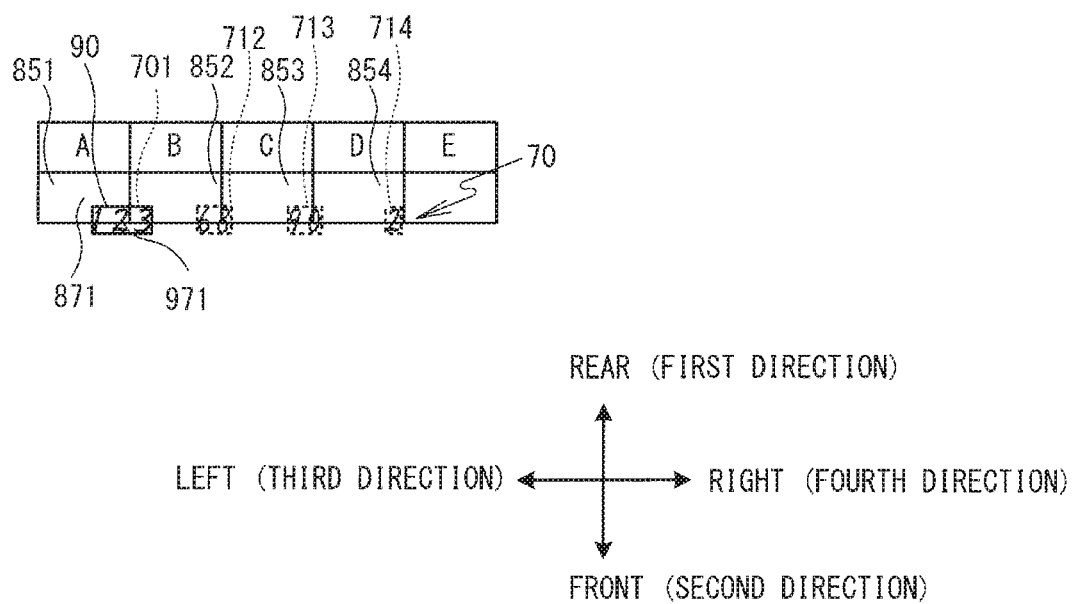
FIG. 14A is a transition diagram for the track in the second embodiment.

As shown in FIG. 13, the CPU 41 performs the processing at Steps S41 to S44 in the same manner as in the first embodiment. The CPU 41 moves the group 70 such that the center of the group region 90 that was acquired at Step S42 is moved to the same position as the center of the entry frame 85 that was selected at Step S44 (Steps S61 and S62). This will now be explained in detail. FIG. 14A shows that the group region 90 that contains the first group 701 is acquired in a case where the variable q is 1, in the same manner as in FIG. 11A. As shown in FIG. 13, the CPU 41 computes the difference between the coordinates of a center 871 of the entry frame 851 that was selected at Step S44 and the coordinates of a center 971 of the group region 90 that was acquired at Step S42 (Step S61). The CPU 41 moves the first group 701 by the amount of the difference that was computed at Step S61 (Step S62). The center 971 of the group region 90 that was acquired at Step S42 is thus moved to the same position as the center 871 of the entry frame 851 that was selected at Step S44, as shown in FIG. 14B.

In the same manner as in the processing that is shown in FIG. 10, the CPU 41 performs the processing at Steps S51, S52, then returns the processing to Step S42, as shown in FIG. 13. By repeating the processing at Steps S42 to S44, S61, S62, S51, and S52, the CPU 41 moves the tracks that are contained in each one of the groups 70 into the corresponding entry frames 851, as shown in FIG. 14C.

Figure 14C:
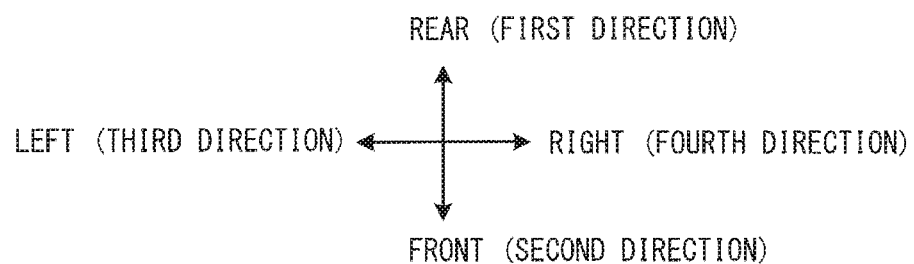
FIG. 14C is a transition diagram for the track in the second embodiment.

In the second embodiment, the PC 4 is able to move the tracks that are contained in the first to the fourth groups 701, 712, 713, 714 to the centers of the corresponding entry frames 851 to 854, as shown in FIG. 14C. Thus, when the tracks that are described by the stroke data are displayed or printed such that the tracks are superimposed on the image of the paper medium 101 that is described by the paper medium data, the quality of the visible appearance is better than would be the case if the tracks that are contained in the groups 70 were to be positioned in the corners of the entry frames 85.

Figure 15:
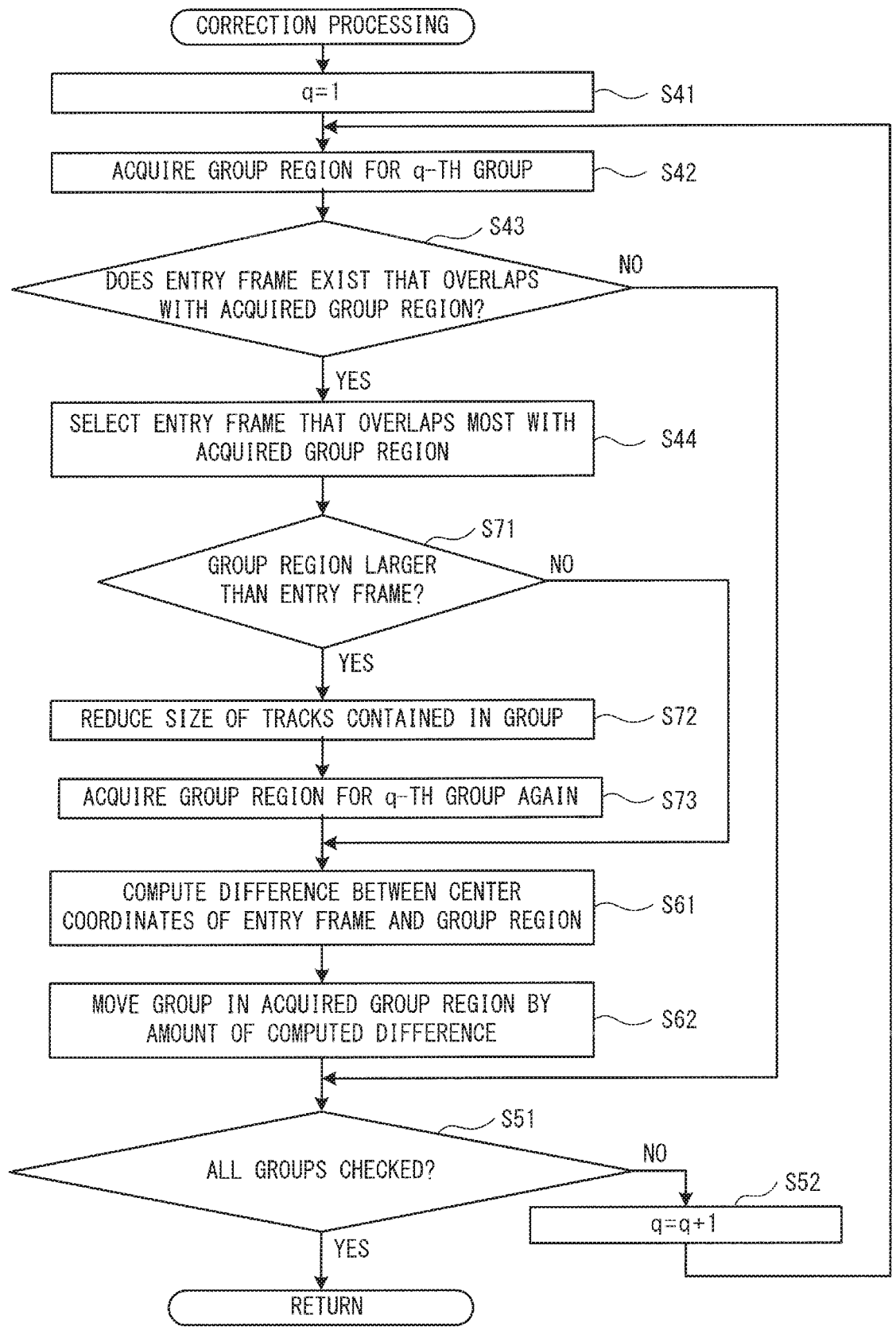
FIG. 15 is a flowchart of the correction processing in a third embodiment.

In the embodiments that are described above, the size of the tracks that are contained in the groups 70 is not modified. The size of the tracks that are contained in the groups 70 may also be modified. Hereinafter, a third embodiment will be explained in which the correction processing includes processing that reduces the size of the tracks that are contained in the groups 70. This modified example of the correction processing is shown in FIG. 15. In FIG. 15, the parts of the processing that are the same as in the first embodiment and the second embodiment are indicated by the same step numbers, and a detailed explanation will be omitted.

As shown in FIG. 15, the CPU 41 performs the processing at Steps S41 to S44 in the same manner as in the embodiments that are described above. The CPU 41 compares the size of the group region 90 that was acquired at Step S42 with the size of the entry frame 85 that was selected at Step S44. The CPU 41 determines whether or not the result of the comparison is that the size of the group region 90 is greater than the size of the entry frame 85 (Step S71). In a case where the size of the group region 90 is not greater than the size of the entry frame 85 (NO at Step S71), the CPU 41 advances the processing to Step S61.

In a case where the size of the group region 90 is greater than the size of the entry frame 85 (YES at Step S71), the size of the tracks that are contained in the group 70 is modified such that the size of the group region 90 becomes not greater than the size of the entry frame 85 (Step S72).

Figure 16B:
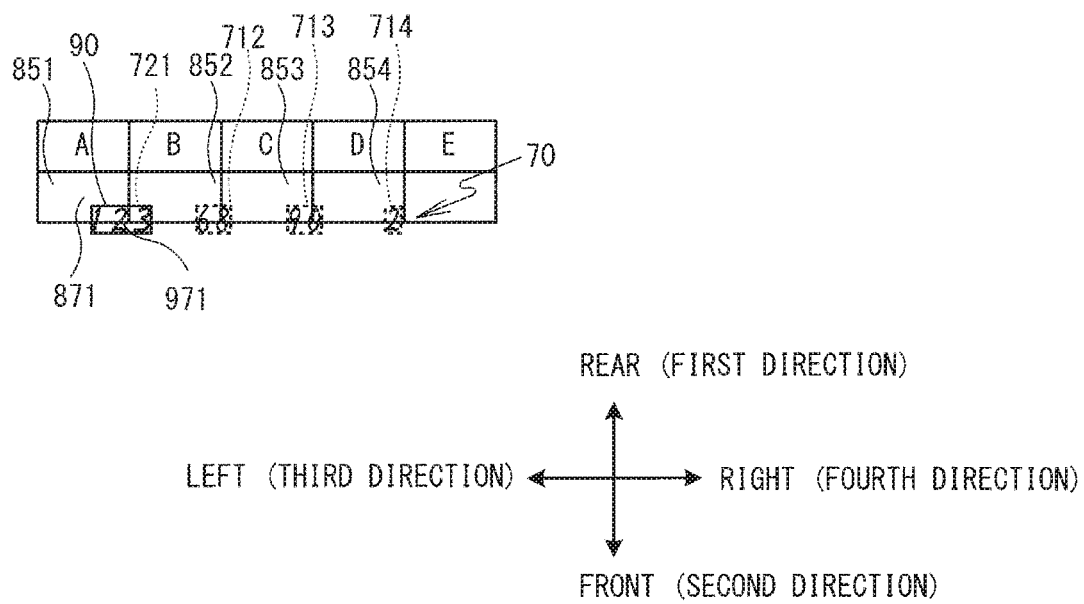
FIG. 16B is a transition diagram for the track in the third embodiment.

FIG. 16A shows a case in which the tracks that are contained in the first group 701 in FIG. 11A are written such that the tracks are larger than the size of the entry frame 851. This group is defined as a first group 721. In a case where the variable q is 1, the CPU 41 determines that the size of the group region 90 that contains the first group 721 is greater than the size of the entry frame 851 (YES at Step S71). As shown in FIG. 16B, the CPU 41 modifies the size of the tracks that are contained in the first group 721 so as to make the size of the group region 90 not greater than the size of the entry frame 851 (Step S72).

As shown in FIG. 15, after executing Step S72, the CPU 41 once again acquires the q-th group region 90 that contains the group 70 in which the tracks have been made smaller (Step S73), in the same manner as was done at Step S42. The CPU 41 performs the processing at Steps S61 and S62 in the same manner as in the second embodiment. Note that in a case where the tracks have been made smaller at Step S72, the processing at Steps S61 and S62 is performed on the group region 90 that was reacquired at Step S73 (refer to FIG. 16B), not on the group region 90 that was acquired at Step S42. The CPU 41 thus moves the reduced-size tracks that are contained in the first group 721 to the center of the entry frame 851, as shown in FIG. 16C.

In the same manner as in the processing in the embodiments that are described above, the CPU 41 performs the processing at Steps S51, S52, then returns the processing to Step S42. The CPU 41 repeatedly performs the processing at Steps S42 to S44, Steps S71 to S73, S61, S62, S51, and S52. The tracks that are contained in each one of the groups 70 are thus moved into the corresponding entry frames 851 to 854, as shown in FIG. 16D.

In the third embodiment, even if the size of the group region 90 is greater than the size of the entry frame 85, as shown in FIG. 16A, the PC 4 is able to modify the size of the group region 90 and fit the size of the group region 90 into the entry frame 85, as shown in FIGS. 16C and 16D. Furthermore, when the tracks that are described by the stroke data are displayed or printed such that they are superimposed on the image of the paper medium 101 that is described by the paper medium data, for example, the quality of the visible appearance is improved.

Figure 17:
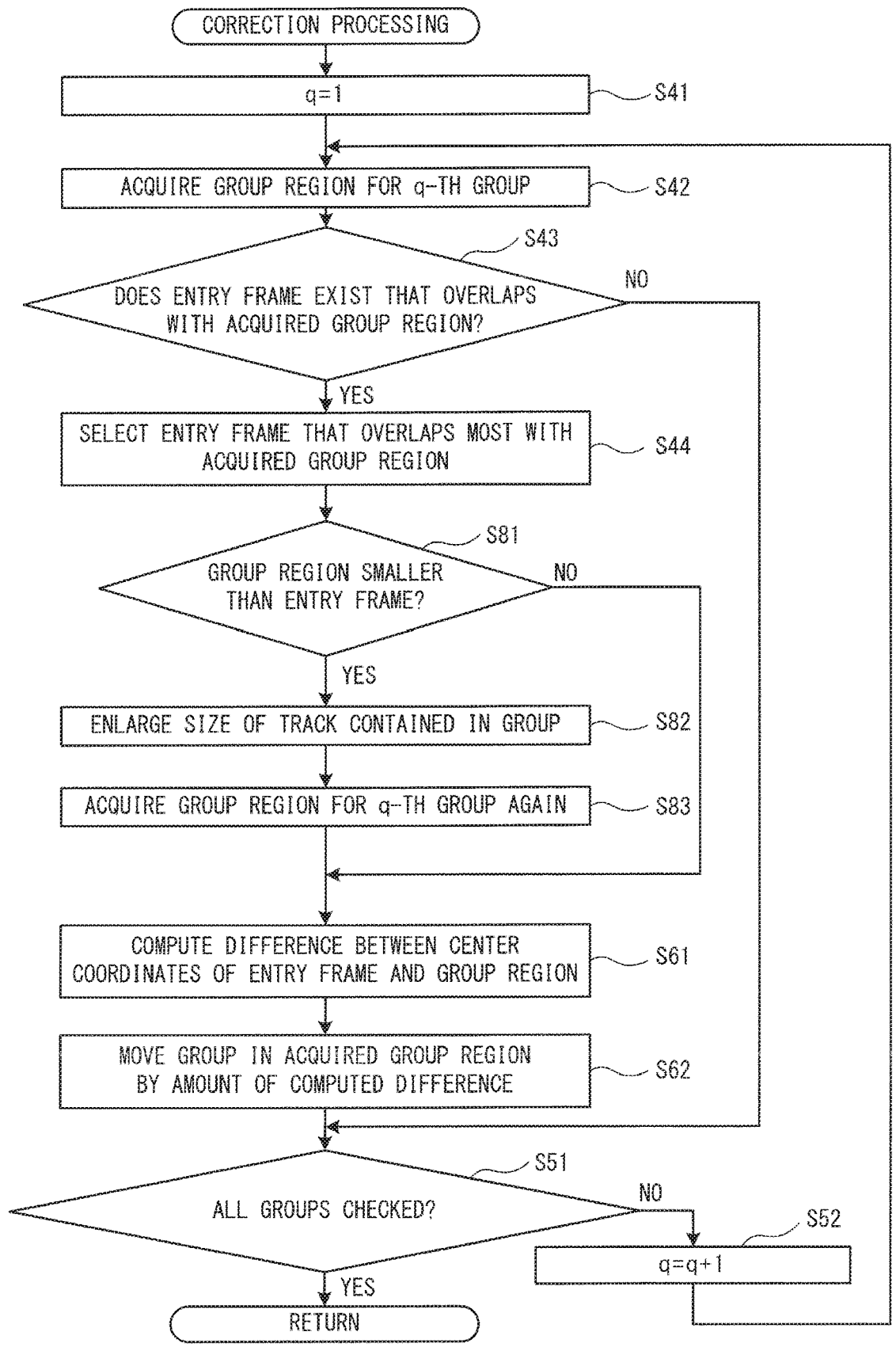
FIG. 17 is a flowchart of the correction processing in a fourth embodiment.

A fourth embodiment will be explained in which the correction processing includes processing that enlarges the size of the tracks that are contained in the groups 70. This modified example of the correction processing is shown in FIG. 17. In FIG. 17, the parts of the processing that are the same as in the first to the third embodiments are indicated by the same step numbers, and a detailed explanation will be omitted.

As shown in FIG. 17, the CPU 41 performs the processing at Steps S41 to S44 in the same manner as in the embodiments that are described above. Next, the CPU 41 compares the size of the group region 90 that was acquired at Step S42 with the size of the entry frame 85 that was selected at Step S44. The CPU 41 determines whether or not the result of the comparison is that the size of the group region 90 is less than the size of the entry frame 85 (Step S81). In a case where the size of the group region 90 is not less than the size of the entry frame 85 (NO at Step S81), the CPU 41 advances the processing to Step S61.

In a case where the size of the group region 90 is less than the size of the entry frame 85 (YES at Step S81), the CPU 41 modifies the size of the tracks that are contained in the group 70 such that the size of the group region 90 is enlarged within a range that is not greater than the size of the entry frame 85 (Step S82).

FIG. 18A is the same as FIG. 11A. In a case where the variable q is 1, the CPU 41 determines that the size of the group region 90 that contains the first group 701 is less than the size of the entry frame 851 (YES at Step S81). As shown in FIG. 18B, the CPU 41 modifies the size of the tracks that are contained in the first group 701 such that the size of the group region 90 is enlarged within a range that is not greater than the size of the entry frame 851 (Step S82).

As shown in FIG. 17, after executing Step S82, the CPU 41 once again acquires the q-th group region 90 that contains the group 70 in which the tracks have been enlarged (Step S83), in the same manner as was done at Step S42. Next, the CPU 41 performs the processing at Steps S61 and S62 in the same manner as in FIG. 15. Note that in a case where the tracks have been enlarged at Step S82, the processing at Steps S61 and S62 is performed on the group region 90 that was reacquired at Step S83, not on the group region 90 that was acquired at Step S42. The CPU 41 thus moves the enlarged tracks that are contained in the first group 701 to the center of the entry frame 851, as shown in FIG. 18C.

In the same manner as in FIG. 15, the CPU 41 performs the processing at Steps S51, S52, then returns the processing to Step S42. The CPU 41 repeatedly performs the processing at Steps S42 to S44, Steps S81 to S83, S61, S62, S51, and S52. The CPU 41 thus enlarges the tracks that are contained in the first to the fourth groups 701, 712, 713, 714 and moves the tracks into the corresponding entry frames 851 to 854, as shown in FIG. 18D.

In the fourth embodiment, the tracks are enlarged within a range that fits inside the entry frames 85, as shown in FIGS. 18A and 18D. Therefore, when the tracks that are described by the stroke data are displayed or printed such that the tracks are superimposed on the image of the paper medium 101 that is described by the paper medium data, for example, the legibility of the tracks within the entry frames 85 can be improved. The quality of the visible appearance is improved.

In the third embodiment and the fourth embodiment, the CPU 41 compares the size of the group region 90 that was acquired at Step S42 with the size of the entry frame 85 that was selected at Step S44 (Steps S71 and S81). In accordance with the result of the comparison, the CPU 41 modifies the size of the tracks that are contained in the group 70 that is contained in the group region 90 that was acquired at Step S42 (Steps S72 and S82). Modifying the track size in accordance with the size of the group region 90 and the size of the entry frame 85 makes it possible to improve the quality of the visible appearance when the tracks that are described by the stroke data are displayed or printed such that the tracks are superimposed on the image of the paper medium 101 that is described by the paper medium data, for example.

Figure 19:
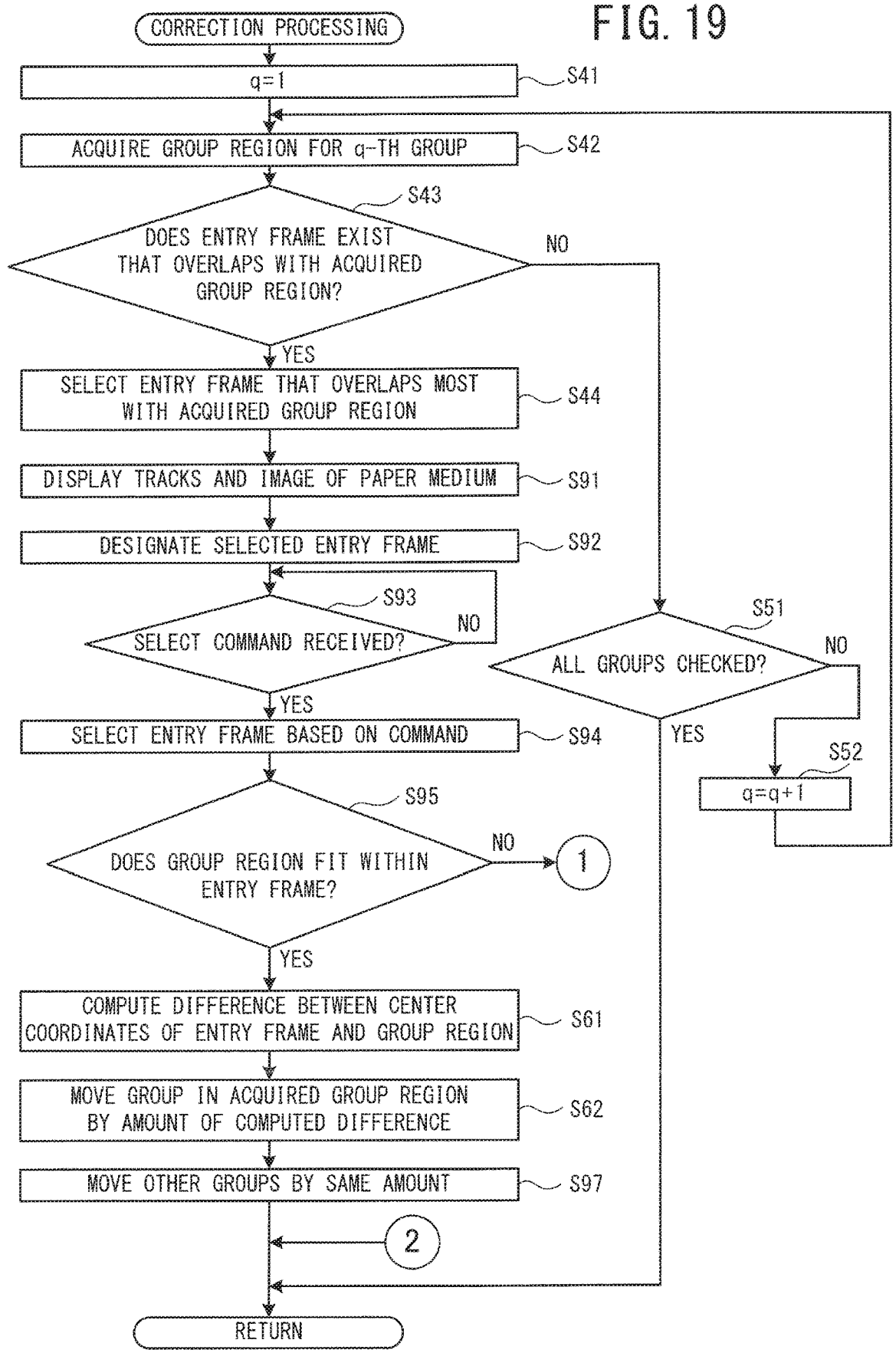
FIG. 19 is a flowchart of the correction processing in a fifth embodiment.

In the embodiments that are described above, the entry frame 85 is selected by the CPU 41 (Step S44). After selecting the entry frame 85, the CPU 41 may also select a different entry frame 85 based on a user command After moving one of the groups 70 by a certain amount, the CPU 41 may also move another one of the groups 70 by the same amount. Hereinafter, this modified example will be explained as a fifth embodiment. In FIG. 19, the parts of the processing that are the same as in the first to the fourth embodiments are indicated by the same step numbers, and a detailed explanation will be omitted.

The CPU 41 performs the processing at Steps S41 to S44 in the same manner as in the embodiments that are described above. In a case where none of the entry frames 85 overlaps with the group region 90 that was acquired at Step S42 (NO at Step S43), the CPU 41 performs the processing at Steps S51 and S52, then returns the processing to Step S42.

The paper medium data that are stored on the HDD 42 include at least one set of the entry frame data, with each set of the entry frame data describing one of the entry frames 85. In the explanation that follows, the entry frame 85 that overlaps the most with the group region 90 that was acquired at Step S42 (that is, the entry frame 85 that was selected at Step S44) will be called the first entry frame 85. The entry frames 85 other than the first entry frame 85 will be called the second entry frames 85.

Figure 21:
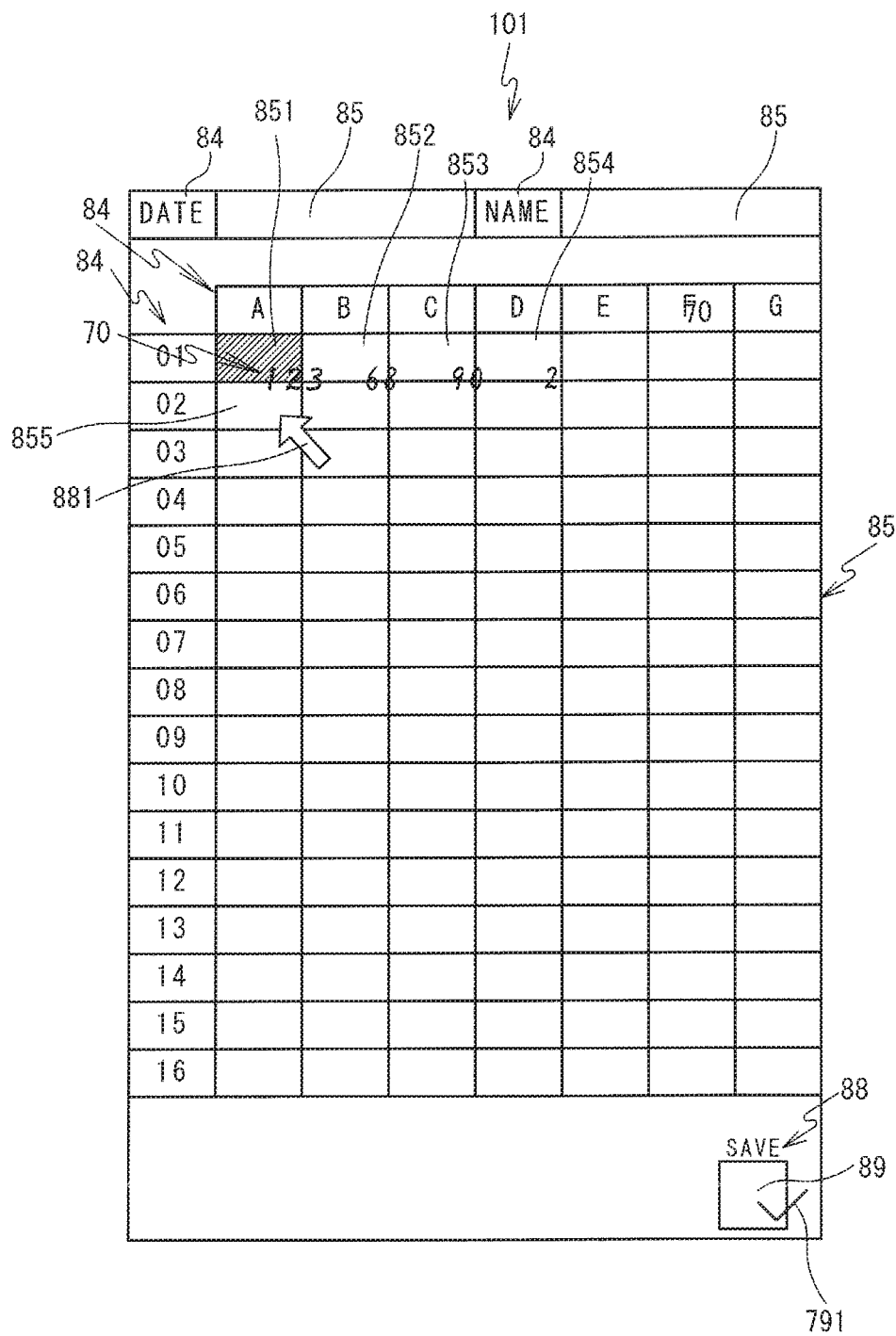
FIG. 21 is a figure that shows an example of an image that is displayed on a display in the fifth embodiment.

After executing Step S44, the CPU 41 displays, on the display 48, the tracks that are described by the stroke data and the image of the paper medium 101 that is described by the paper medium data that are stored on the HDD 42, as shown in FIG. 21 (Step S91). The display 48 itself is omitted from FIG. 21. The CPU 41 designates the first entry frame 85 on the image of the paper medium 101 that was displayed on the display 48 at Step S91 (Step S92). The method for designating the first entry frame 85 is not limited to any particular method. For example, the outline of the first entry frame 85 may be made to flash, and the first entry frame 85 may be displayed in a different color from that of the second entry frames 85. In the example that is shown in FIG. 21, the first entry frame 85 (that is, the entry frame 851) is displayed in a different color from that of the second entry frames 85.

The CPU 41 determines whether or not a command has been input to select one of the entry frames 85 that are described by the entry frame data in the image of the paper medium 101 that was displayed at Step S91 (Step S93). That is, the CPU 41 determines whether or not a command to select one of the entry frames 85 has been received. The user inputs the command to select one of the entry frames 85 to the PC 4 by operating the input portion 47 (refer to FIG. 2). For example, the user may select one of the entry frames 85 by operating the input portion 47 to move a cursor 881 that is displayed on the display 48 (refer to FIG. 21).

In a case where the command to select one of the entry frames 85 has not been received (NO at Step S93), the CPU 41 repeats Step S93. In a case where the command to select one of the entry frames 85 has been received (YES at Step S93), the CPU 41 selects one of the entry frames 85 based on the command that was received at Step S93 to select one of the first entry frame 85 and the second entry frames 85 (Step S94). In the specific example that is shown in FIG. 21, an entry frame 855 that is directly below the entry frame 851 is selected. The CPU 41 determines whether or not the group region 90 will fit within the entry frame 85 that was selected at Step S94 (Step S95).

Figure 20:
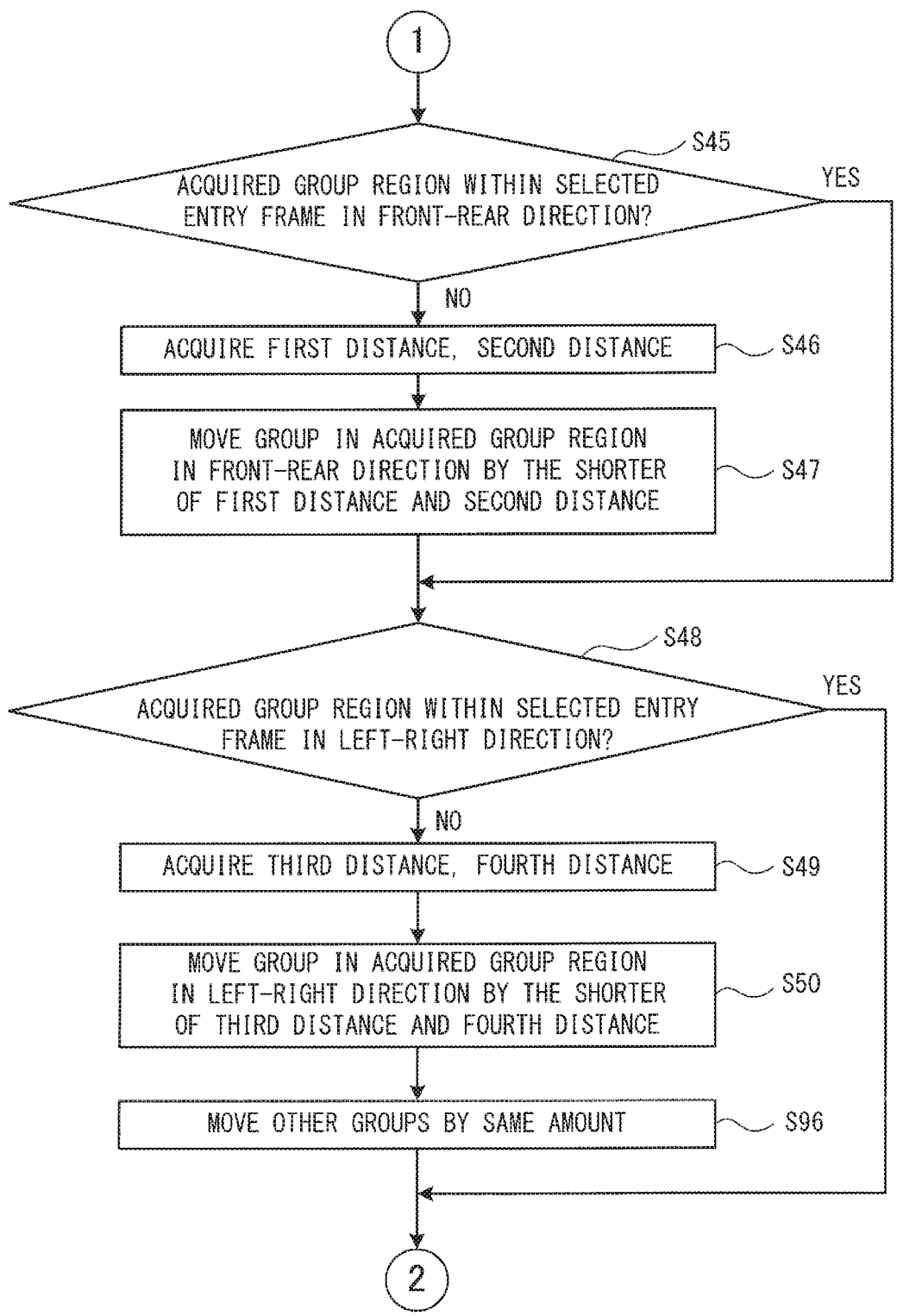
FIG. 20 is a flowchart that continues from FIG. 19.

In a case where the group region 90 will not fit within the entry frame 85 that was selected at Step S94 (NO at Step S95), the CPU 41 performs the processing at Steps S45 to S50, as shown in FIG. 20. That is, the CPU 41 moves the group 70 that is contained in the group region 90 that was acquired at Step S42 into the entry frame 85 that was selected at Step S94.

Figure 22:
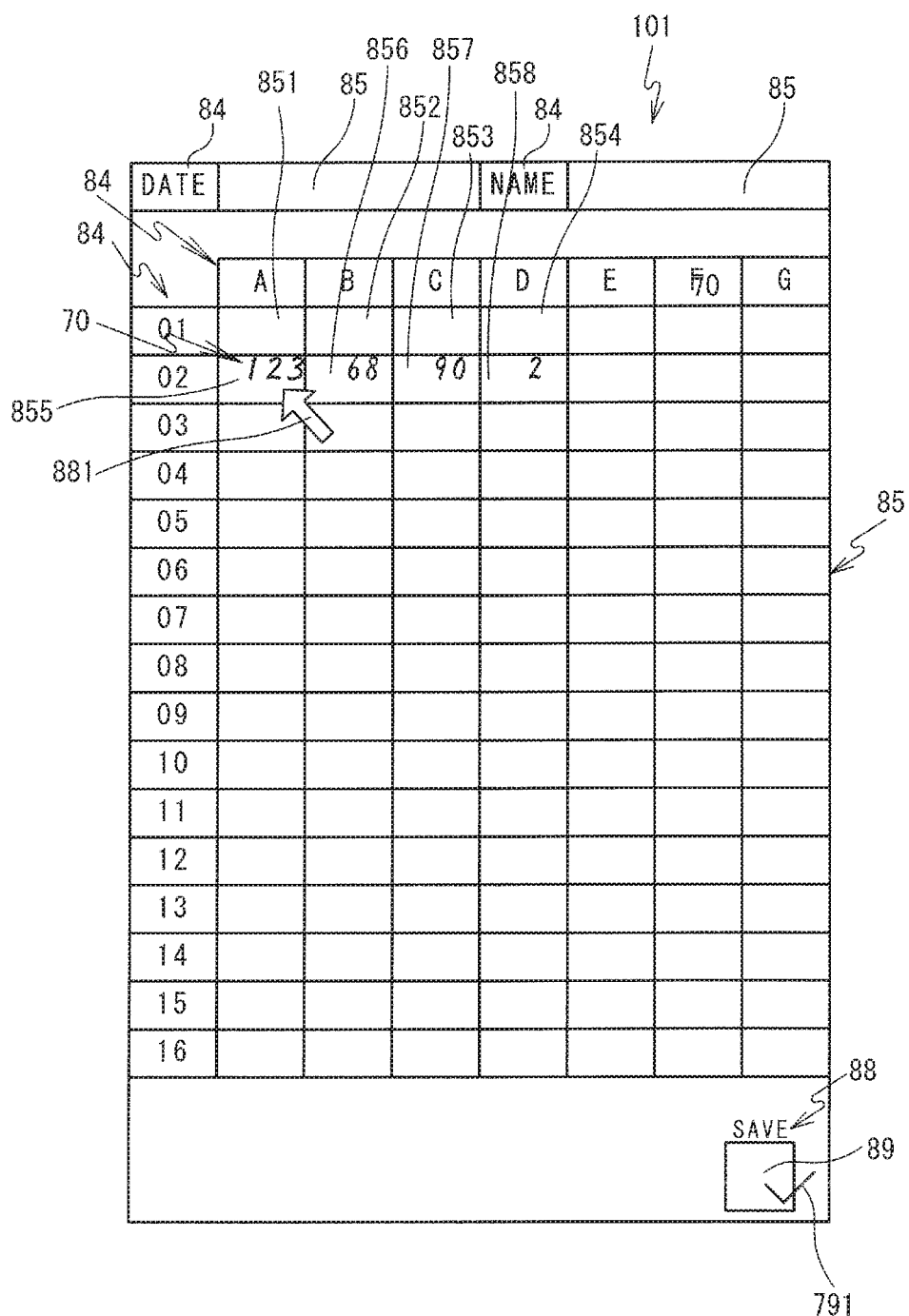
FIG. 22 is a figure that shows an example of an image after a position of the track has shifted.

The CPU 41 moves the other groups 70 by the same amount as the group 70 that was moved at Steps S47 and S50 (Step S96). That is, in addition to moving the group 70 into one of the first entry frame 85 and the second entry frame 85 that was selected at Step S94, the CPU 41 moves the other groups 70 by the same amount as the group 70 moved. In the specific example, the text sets "68", "90", and "2" are moved by the same amount as the text set "123", as shown in FIG. 22. The text sets "123", "68", "90", and "2" are thus moved into entry frames 855 to 858, directly below the entry frames 851 to 854, respectively. Next, as shown in FIG. 19, the CPU 41 terminates the correction processing and returns the processing to the main processing.

In a case where the group region 90 will fit within the entry frame 85 that was selected at Step S94 (YES at Step S95), the CPU 41 performs the processing at Steps S61 and S62. That is, the CPU 41 moves the group 70 that is contained in the group region 90 that was acquired at Step S42 such that the center of the group region 90 that was acquired at Step S42 is moved to the same position as the center of the entry frame 85 that was selected at Step S94.

Next, the CPU 41 moves the other groups 70 by the same amount as the group 70 that was moved at Step S62 (Step S97). That is, in addition to moving the group 70 into one of the first entry frame 85 and the second entry frame 85 that was selected at Step S94, the CPU 41 moves the other groups 70 by the same amount as the group 70 moved.

Assume, for example, that the text sets "123", "68", "90", and "2" respectively fit into the entry frames 851 to 854, and that the entry frame 851 is the first entry frame 85 that is selected at Step S93, although this is not shown in the drawings. In this case, the CPU 41 determines that the group region 90 for the text set "123" fits into the entry frame 851 (YES at Step S95), moves the text set "123" to the center of the entry frame 851 (Step S62), and moves the other text sets "68", "90", and "2" by the same amount as the text set "123". In a case where the user has written on the paper medium 100, the text sets "123", "68", "90", and "2" tend to be misaligned by the same distance from the centers of the entry frames 851 to 854, respectively. Therefore, moving the text sets "68", "90", and "2" by the same amount that the text set "123" was moved to the center of the entry frame 851 makes it easier to position all of the text sets "123", "68", "90", and "2" in the respective centers of the entry frames 851 to 854. The CPU 41 terminates the correction processing and returns the processing to the main processing.

As described above, in the fifth embodiment, the PC 4 is able to let the user select the entry frame 85 into which the tracks will be moved. This is more convenient for the user, because the user is able to move the tracks into the desired entry frame 85. Furthermore, the first entry frame 85, which is the entry frame 85 with the greatest overlap with the group region 90, is designated on the image of the paper medium 101 (Step S92). It is therefore easy for the user to confirm the entry frame 85 with the greatest overlap with the group region 90. This makes it more convenient for the user to input the command to select the entry frame 85.

All of the plurality of the groups 70 that are identified at Step S13 (refer to FIG. 5) are moved by the same amount as the one group 70 that is contained in the group region 90 that is acquired at Step S42 (refer to FIG. 19) (Steps S96 and S97). Therefore, the processing load on the CPU 41 is less than it would be in a case where the misalignment is corrected individually for each one of the groups 70 based on the positions of the tracks and the entry frames 85.

The user's selecting of only one of the entry frames 85 (YES at Step S93) causes the tracks that are contained in all of the groups 70 to be moved collectively (Steps S47, S50, S96, S62, and S97). The system is therefore more convenient for the user than would be the case if the user selected every one of the entry frames 85 individually.

Note that in the fifth embodiment, the user's selecting of only one of the entry frames 85 (YES at Step S93) causes the tracks that are contained in all of the groups 70 to be moved (Steps S47, S50, S96, S62, and S97). In the same manner, once the CPU 41 in the first to the fourth embodiments moves one of the groups 70, the CPU 41 may also move the other groups 70 by the same amount. In this case as well, the processing load on the CPU 41 is less than it would be in a case where the misalignment is corrected individually for each one of the groups 70 based on the positions of the tracks and the entry frames 85.

Note that in the various specific examples in the embodiments that are described above, because the form 700 is positioned such that the form 700 is misaligned toward the right front in relation to sensor circuit board 7L, the tracks in the text sets "123", "68", "90", and "2" that are described by the stroke data are misaligned toward the right front from the entry frames 851 to 854 that are described by the entry frame data. However, the causes of misalignment are not limited to the misalignment of a form on the sensor circuit board. For example, misalignment sometimes occurs because the position of the coil 32 changes according to the tilt of the electronic pen 3 when the user is writing.

In the embodiments that are described above, the entry frames 85 are rectangular, but the entry frames 85 may also be of a different shape. In the embodiments that are described above, the main processing is performed by the CPU 41 of the PC 4, but the system is not limited to this configuration. For example, the main processing may also be performed by the CPU 21 of the reading device 2. In that case, the various types of output data, such as programs and the like, for performing the main processing may be stored in the flash ROM 22 instead of in the HDD 42 and the RAM 43. The CPU 21 may also transmit the corrected stroke data to the PC 4. Note that the reading device 2 may also be connected to a portable terminal or the like, instead of to the PC 4, and the CPU of the portable terminal or the like may perform the main processing. A display may also be added to the reading device 2, and the image that is displayed on the display 48 in the embodiments that are described above may be displayed on the display of the reading device 2 instead.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A writing data processing device comprising:
   a processor; and
   a memory storing computer-readable instructions that, when executed by the processor, perform the processes of:
   acquiring stroke data describing a plurality of tracks of a writing portion on a mount portion on which a paper medium is mounted;
   identifying tracks as a group among the plurality of the tracks described by the acquired stroke data, each of the tracks included in the group being not greater than a specified distance from one another;
   acquiring a group region, the group region being a region that includes the identified group;
   identifying a first entry frame from among a plurality of entry frames described by entry frame data that is stored in a storage portion and corresponds to the paper medium, the first entry frame having the greatest amount of overlap with the acquired group region;

displaying a selection image described by the entry frame data on a display portion, the selection image including the identified first entry frame and at least one second entry frame other than the first entry frame, the selection image being displayed on the display portion with the identified first entry frame highlighted;

receiving a selection command, based on a user input via operating an input portion, to select one of the plurality of the entry frames from the selection image displayed on the display portion; and moving the identified group included in the acquired group region into the selected entry frame that is selected based on the selection command.

2. The writing data processing device according to claim 1, wherein the plurality of the entry frames described by the entry frame data stored in the storage portion is rectangular, the acquiring the group region includes acquiring the group region as a rectangular region that includes the identified group, and the moving of the identified group includes:

acquiring a first distance, the first distance being a distance between a first direction edge of the selected entry frame and a first direction edge of the acquired group region, the first direction edge of the selected entry frame being one of a pair of opposing edges of the selected entry frame, and the first direction edge of the acquired group region being one of a pair of opposing edges of the acquired group region;

acquiring a second distance, the second distance being a distance between a second direction edge of the selected entry frame and a second direction edge of the acquired group region, the second direction edge of the selected entry frame being an opposite edge of the first direction edge of the selected entry frame, the second direction edge of the acquired group region being an opposite edge of the first direction edge of the acquired group region, the second direction being a direction opposite to the first direction;

moving the identified group in one of the first direction and the second direction by the shorter of the first distance and the second distance;

acquiring a third distance, the third distance being a distance between a third direction edge of the selected entry frame and a third direction edge of the acquired group region, the third direction edge of the selected entry frame being one of a pair of opposing edges of the selected entry frame, the third direction edge of the acquired group region being one of a pair of opposing edges of the acquired group region, the third direction being orthogonal to the first direction and the second direction;

acquiring a fourth distance, the fourth distance being a distance between a fourth direction edge of the selected entry frame and a fourth direction edge of the acquired group region, the fourth direction edge of the selected entry frame being an opposite edge of the third direction edge of the selected entry frame, the fourth direction edge of the acquired group region being an opposite edge of the third direction edge of the acquired group region, the fourth direction being a direction opposite to the third direction; and moving the identified group in one of the third direction and the fourth direction by the shorter of the third distance and the fourth distance.

3. The writing data processing device according to claim 1, wherein the moving the identified group includes moving the identified group such that a position of a center of the acquired group region corresponds to a position of a center of the selected entry frame.

4. The writing data processing device according to claim 1, wherein the computer-readable instructions, when executed by the processor, further perform the process of:

comparing a size of the acquired group region and a size of the selected entry frame; and changing a size of the tracks in the identified group included in the acquired group region in accordance with a comparison result of the comparing.

5. The writing data processing device according to claim 4, wherein the changing of the size of the tracks includes reducing the size of the acquired group region to not greater than the size of the selected entry frame in a case where the comparison result of the comparing is that the size of the acquired group region is greater than the size of the selected entry frame.

6. The writing data processing device according to claim 4, wherein the changing of the size of the tracks includes enlarging the size of the acquired group region within a range not greater than the size of the selected entry frame in a case where the comparison result of the comparing is that the size of the acquired group region is less than the size of the selected entry frame.

7. The writing data processing device according to claim 1, wherein the identifying the tracks as the group includes identifying a plurality of the groups, the acquiring the group region includes acquiring the group region for one of the plurality of the identified groups, and the moving of the identified group includes:

moving the one of the plurality of the identified groups included in the acquired group region into the selected entry frame; and moving rest of the plurality of the identified groups by the same amount as the identified group included in the acquired group region was moved.

* * * * *